(12) United States Patent  (10) Patent No.: US 8,707,682 B2
Bisaiji                    (45) Date of Patent:     Apr. 29, 2014

(54) EXHAUST PURIFICATION SYSTEM OF INTERNAL COMBUSTION ENGINE

(75) Inventor: Yuki Bisaiji, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 124 days.

(21) Appl. No.: 13/502,210

(22) PCT Filed: Aug. 25, 2011

(86) PCT No.: PCT/JP2011/069859
§ 371 (c)(1),
(2), (4) Date: Apr. 16, 2012

(87) PCT Pub. No.: WO2013/027300
PCT Pub. Date: Feb. 28, 2013

(65) Prior Publication Data
US 2013/0047589 A1   Feb. 28, 2013

(51) Int. Cl.
*F01N 3/00*      (2006.01)

(52) U.S. Cl.
USPC .................................. 60/286; 60/299; 60/301

(58) Field of Classification Search
USPC ........................................... 60/286, 299, 301
See application file for complete search history.

(56) References Cited

U.S. PATENT DOCUMENTS

| 7,332,135 | B2 * | 2/2008 | Gandhi et al. ................ 422/177 |
| 2004/0050037 | A1 | 3/2004 | Betta et al. |
| 2007/0016357 | A1 * | 1/2007 | Nakagawa et al. ........... 701/104 |
| 2008/0053073 | A1 | 3/2008 | Kalyanaraman et al. |
| 2008/0120963 | A1 * | 5/2008 | Morita et al. .................. 60/276 |
| 2009/0000277 | A1 | 1/2009 | Yoshida et al. |
| 2009/0049824 | A1 * | 2/2009 | Kojima et al. ................. 60/285 |
| 2009/0049826 | A1 | 2/2009 | Toshioka et al. |
| 2009/0191108 | A1 * | 7/2009 | Blanchard et al. ......... 423/239.1 |
| 2009/0313970 | A1 * | 12/2009 | Iida ................................ 60/276 |

(Continued)

FOREIGN PATENT DOCUMENTS

| JP | A-2004-308526 | 11/2004 |
| JP | A-2004-316458 | 11/2004 |

(Continued)

OTHER PUBLICATIONS

International Search Report issued in International Application No. PCT/JP2011/066628 dated Sep. 13, 2011 (with Translation).

(Continued)

*Primary Examiner* — Thomas Denion
*Assistant Examiner* — Jason Shanske
(74) *Attorney, Agent, or Firm* — Oliff PLC

(57) ABSTRACT

In an internal combustion engine, an upstream side air-fuel ratio sensor (23), hydrocarbon feed valve (15), exhaust purification catalyst (13), and the downstream side air-fuel ratio sensor (24) are arranged in an engine exhaust passage in that order from the upstream side. If hydrocarbons are fed from the hydrocarbon feed valve (15), the air-fuel ratio which is detected by the downstream side air-fuel ratio sensor (24) changes to the rich side from the reference air-fuel ratio which is detected when hydrocarbons are not fed from the hydrocarbon feed valve (15). The amount of hydrocarbons which are fed from the hydrocarbon feed valve (15) and which slip through the exhaust purification catalyst (13) is detected from the air-fuel ratio difference between the air-fuel ratio detected by the upstream side air-fuel ratio sensor (23) and the reference air-fuel ratio detected by the downstream side air-fuel ratio sensor (24).

12 Claims, 25 Drawing Sheets

(56) References Cited

U.S. PATENT DOCUMENTS

| | | | |
|---|---|---|---|
| 2010/0005873 A1* | 1/2010 | Katoh et al. | 73/114.75 |
| 2010/0154387 A1* | 6/2010 | Shibata et al. | 60/285 |
| 2010/0242459 A1* | 9/2010 | Tsujimoto et al. | 60/320 |

FOREIGN PATENT DOCUMENTS

| | | |
|---|---|---|
| JP | A-2005-113801 | 4/2005 |
| JP | A-2008-002451 | 1/2008 |
| JP | A-2008-231926 | 10/2008 |
| JP | A-2009-168031 | 7/2009 |
| JP | A-2009-221939 | 10/2009 |

OTHER PUBLICATIONS

U.S. Appl. No. 13/499,211, filed Mar. 29, 2012, in the name of Bisaiji et al.

Office Action dated Jan. 22, 2014 issued in U.S. Appl. No. 13/499,211.

* cited by examiner

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores $NO_x$ which is contained in exhaust gas when the air-fuel ratio of the inflowing exhaust gas is lean and which releases the stored $NO_x$ when the air-fuel ratio of the inflowing exhaust gas becomes rich, which arranges a fuel addition valve in the engine exhaust passage upstream of the $NO_x$ storage catalyst, which arranges an air-fuel ratio sensor inside the engine exhaust passage downstream of the $NO_x$ storage catalyst, and which makes the air-fuel ratio of the exhaust gas which flows into the NOx storage catalyst rich by feeding fuel in the engine exhaust passage from the fuel addition valve when $NO_x$ should be released from the $NO_x$ storage catalyst. (see, for example, Patent Literature 1).

In this regard, in this internal combustion engine, if the fuel addition valve feeds more than the necessary excess hydrocarbons, the amount of hydrocarbons which slip through the $NO_x$ storage catalyst increases. In this case, if it were possible to detect the amount of slip through of the hydrocarbons, it would be possible to reduce the amount of hydrocarbons which are wastefully consumed. However, at the present, it is impossible to detect such an amount of slip through of hydrocarbons by a simple method.

CITATIONS LIST

Patent Literature

Patent Literature 1: Japanese Patent Publication (A) No. 2004-316458

SUMMARY OF INVENTION

Technical Problem

An object of the present invention is to provide an exhaust purification system of an internal combustion engine which can detect the amount of slip through of hydrocarbons by a simple method.

Solution to Problem

According to the present invention, there is provided an exhaust purification system of an internal combustion engine wherein a hydrocarbon feed valve for feeding hydrocarbons is arranged in of an engine exhaust passage, an upstream side air-fuel ratio sensor for detecting an air-fuel ratio of exhaust gas is arranged in the engine exhaust passage upstream of the hydrocarbon feed valve, an exhaust purification catalyst for reacting $NO_x$ contained in exhaust gas and reformed hydrocarbons is arranged in the engine exhaust passage downstream of the hydrocarbon feed valve, a downstream side air-fuel ratio sensor for detecting the air-fuel ratio of the exhaust gas is arranged in the engine exhaust passage downstream of the exhaust purification catalyst, the downstream side air-fuel ratio sensor is a type of sensor which has a solid electrolyte, electrodes respectively covering two side surfaces of the solid electrolyte, and a diffusion resistance layer covering one of electrodes and in which exhaust gas is guided on to the diffusion resistance layer, precious metal catalysts are carried on an exhaust gas flow surface of the exhaust purification catalyst and a basic exhaust gas flow surface part is formed around the precious metal catalysts, the exhaust purification catalyst has a property of reducing the $NO_x$ which is contained in exhaust gas if a concentration of hydrocarbons which flow into the exhaust purification catalyst is made to vibrate by within a predetermined range of amplitude and within a predetermined range of period and has a property of being increased in storage amount of $NO_x$ which is contained in exhaust gas if the vibration period of the hydrocarbon concentration is made longer than the predetermined range, when hydrocarbons are fed from the hydrocarbon feed valve, an air-fuel ratio detected by the downstream side air-fuel ratio sensor changes to a rich side from a reference air-fuel ratio which is detected when hydrocarbons are not fed from the hydrocarbon feed valve, and an amount of hydrocarbons which are fed from the hydrocarbon feed valve and which slip through the exhaust purification catalyst is detected from an air-fuel ratio difference between the air-fuel ratio which is detected by the upstream side air-fuel ratio sensor and the reference air-fuel ratio which is detected by the downstream side air-fuel ratio sensor.

Advantageous Effects of Invention

It is possible to detect an amount of slip through of hydrocarbons from output signals of an upstream side air-fuel ratio sensor and a downstream side air-fuel ratio sensor.

DESCRIPTION OF EMBODIMENTS

Figure 1:
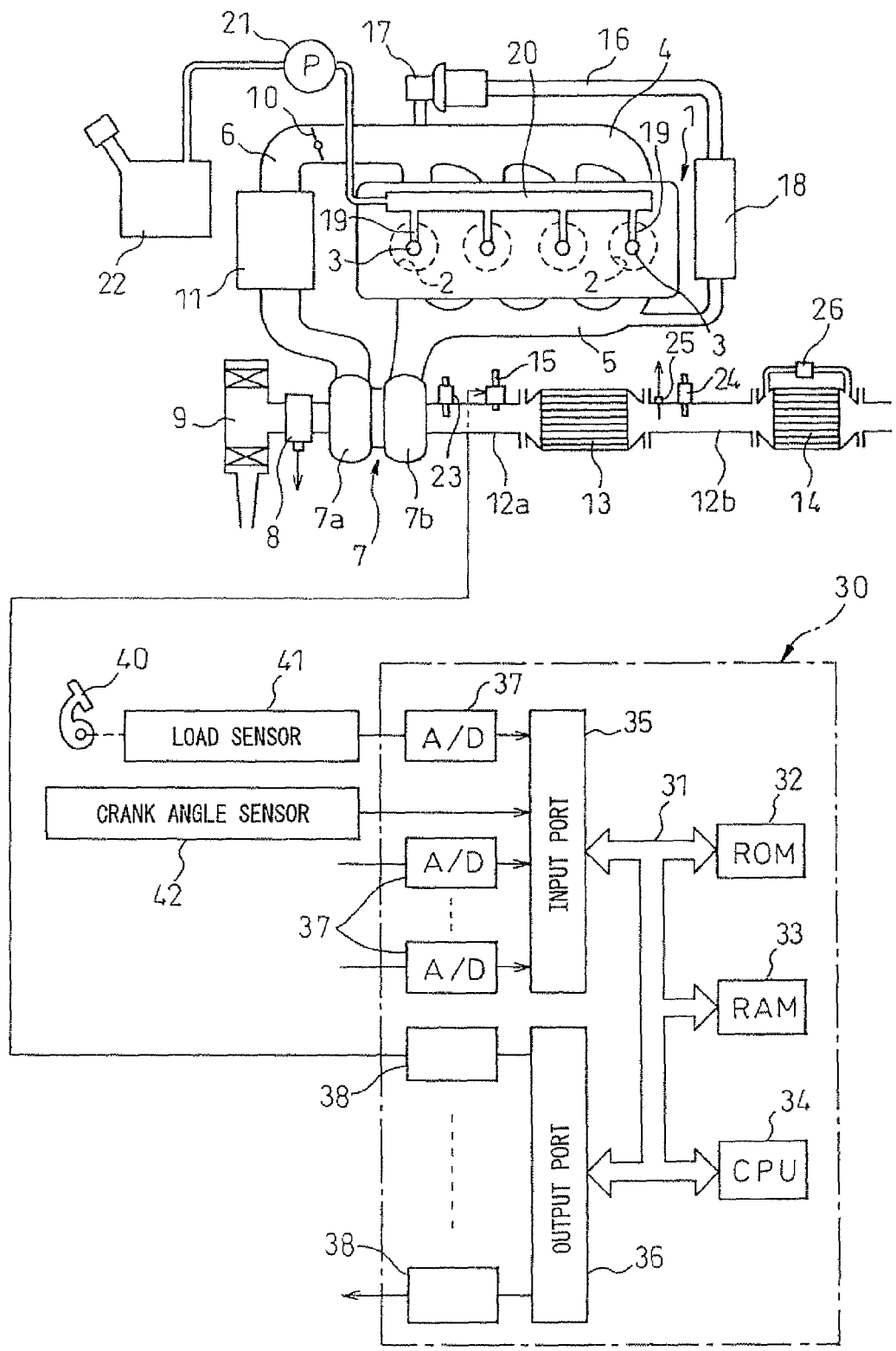
FIG. 1 is an overall view of a compression ignition type internal combustion engine.

FIG. 1 is an overall view of a compression ignition type internal combustion engine.

Referring to FIG. 1, 1 indicates an engine body, 2a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. An outlet of the exhaust turbine 7b is connected through an exhaust pipe 12a to an inlet of the exhaust purification catalyst 13, while an outlet of the exhaust purification catalyst 13 is connected through an exhaust pipe 12b to a particulate filter 14 for trapping particulate which is contained in exhaust gas.

Inside the exhaust pipe 12a upstream of the exhaust purification catalyst 13, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling EGR gas flowing through the inside of the EGR passage 16. In the embodiment shown in FIG. 1, the engine cooling water is guided to the inside of the cooling device 18 where the engine cooling water is used to cool the EGR gas. On the other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 20 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Inside of the exhaust pipe 12a upstream of the hydrocarbon feed valve 15, an upstream side air-fuel ratio sensor 23 for detecting an air-fuel ratio of the exhaust gas which is exhausted from the engine is arranged, while inside of the exhaust pipe 12b downstream of the exhaust purification catalyst 13, a downstream side air-fuel ratio sensor 24 is arranged for detecting an air-fuel ratio of the exhaust gas which flows out from the exhaust purification catalyst 13. Further, downstream of the exhaust purification catalyst 13, a temperature sensor 25 is arranged for detecting the temperature of the exhaust purification catalyst 13, while at the particulate filter 14, a differential pressure sensor 26 is attached for detecting a differential pressure before and after the particulate filter 14. The output signals of these upstream side air-fuel ratio sensor 23, downstream side air-fuel ratio sensor 24, temperature sensor 25, differential pressure sensor 26, and intake air amount detector 8 are input through respectively corresponding AD converters 37 to the input port 35.

Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, step motor for driving the throttle valve 10, hydrocarbon feed valve 15, EGR control valve 17, and fuel pump 21.

Figure 2:
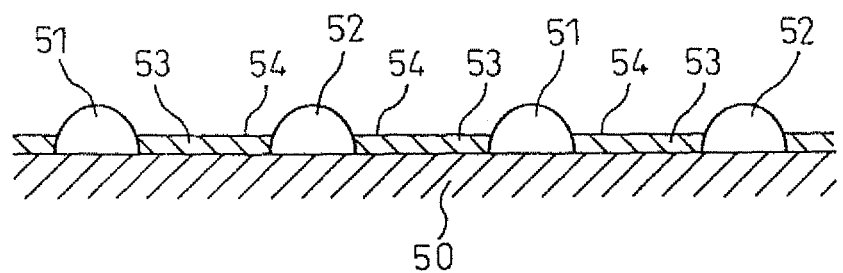
FIG. 2 is a view which schematically shows a surface part of a catalyst carrier.

FIG. 2 schematically shows a surface part of a catalyst carrier which is carried on a substrate of the exhaust purification catalyst 13. At this exhaust purification catalyst 13, as shown in FIG. 2, for example, there is provided a catalyst carrier 50 made of alumina on which precious metal catalysts 51 and 52 are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_x$. The exhaust gas flows along the top of the catalyst carrier 50, so the precious metal catalysts 51 and 52 can be said to be carried on the exhaust gas flow surface of the exhaust purification catalyst 13. Further, the surface of the basic layer 53 exhibits basicity, so the surface of the basic layer 53 is called the basic exhaust gas flow surface part 54.

On the other hand, in FIG. 2, the precious metal catalyst 51 is comprised of platinum Pt, while the precious metal catalyst 52 is comprised of rhodium Rh. That is, the precious metal catalysts 51 and 52 which are carried on the catalyst carrier 50 are comprised of platinum Pt and rhodium Rh. Note that, on the catalyst carrier 50 of the exhaust purification catalyst 13, in addition to platinum Pt and rhodium Rh, palladium Pd may be further carried or, instead of rhodium Rh, palladium Pd may be carried. That is, the precious metal catalysts 51 and 52 which are carried on the catalyst carrier 50 are comprised of platinum Pt and at least one of rhodium Rh and palladium Pd.

Figure 3:
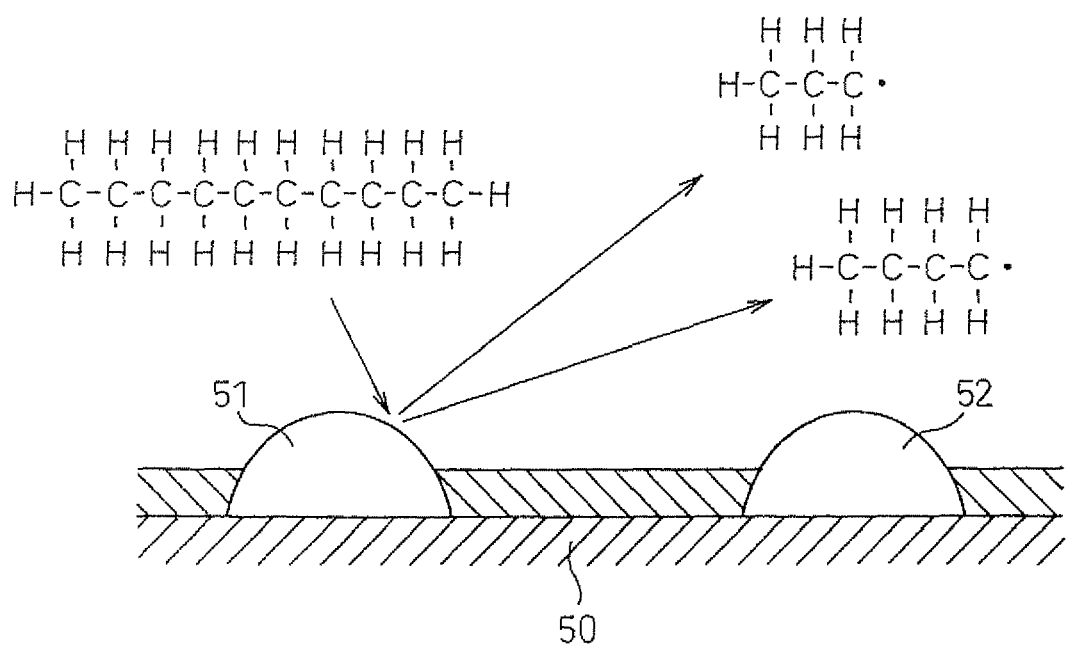
FIG. 3 is a view for explaining an oxidation reaction in an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_x$ at the exhaust purification catalyst 13. FIG. 3 schematically shows the reforming action performed at the exhaust purification catalyst 13 at this time. As shown in FIG. 3, the hydrocarbons HC which are injected from the hydrocarbon feed valve 15 become radical hydrocarbons HC with a small carbon number by the catalyst 51.

Figure 4:
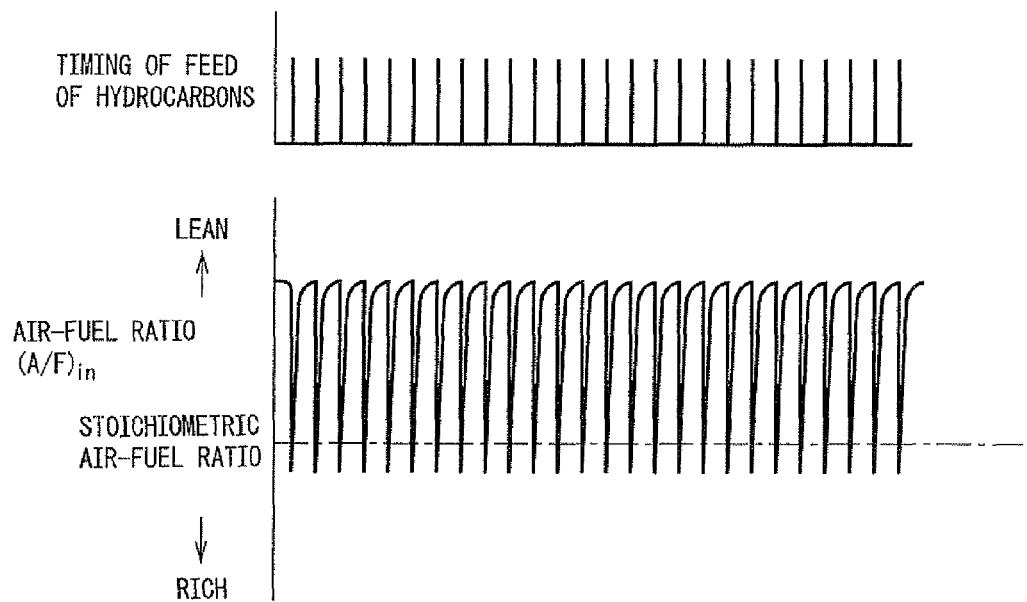
FIG. 4 is a view which shows a change of an air-fuel ratio of exhaust gas flowing into an exhaust purification catalyst.

FIG. 4 shows the feed timing of hydrocarbons from the hydrocarbon feed valve 15 and the change in the air-fuel ratio (A/F) in of the exhaust gas which flows into the exhaust purification catalyst 13. Note that, the changes in the air-fuel ratio (A/F) in depend on the change in concentration of the hydrocarbons in the exhaust gas which flows into the exhaust purification catalyst 13, so it can be said that the change in the air-fuel ratio (A/F) in shown in FIG. 4 expresses the change in concentration of the hydrocarbons. However, if the hydrocarbon concentration becomes higher, the air-fuel ratio (A/F) in becomes smaller, so, in FIG. 4, the more to the rich side the air-fuel ratio (A/F) in becomes, the higher the hydrocarbon concentration.

Figure 5:
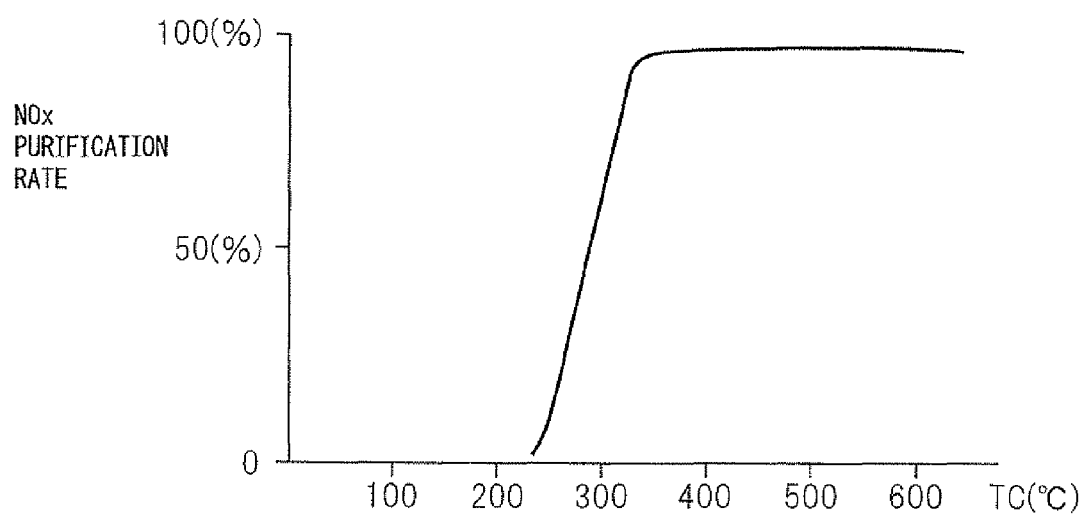
FIG. 5 is a view which shows an $NO_x$ purification rate.

FIG. 5 shows the $NO_x$ purification rate by the exhaust purification catalyst 13 with respect to the catalyst temperatures of the exhaust purification catalyst 13 when periodically making the concentration of hydrocarbons which flow into the exhaust purification catalyst 13 change so as to, as shown in FIG. 4, make the air-fuel ratio (A/F) in of the exhaust gas flowing to the exhaust purification catalyst 13 change. The inventors engaged in research relating to $NO_x$ purification for a long time. In the process of research, they learned that if making the concentration of hydrocarbons which flow into the exhaust purification catalyst 13 vibrate by within a predetermined range of amplitude and within a predetermined range of period, as shown in FIG. 5, an extremely high $NO_x$ purification rate is obtained even in a 400° C. or higher high temperature region.

Figure 6A:
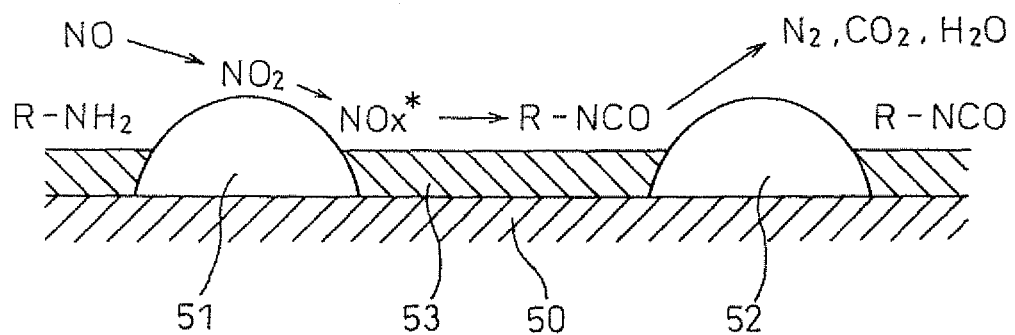
FIGS. 6A and 6B are views for explaining an oxidation reduction reaction in an exhaust purification catalyst.
Figure 6B:
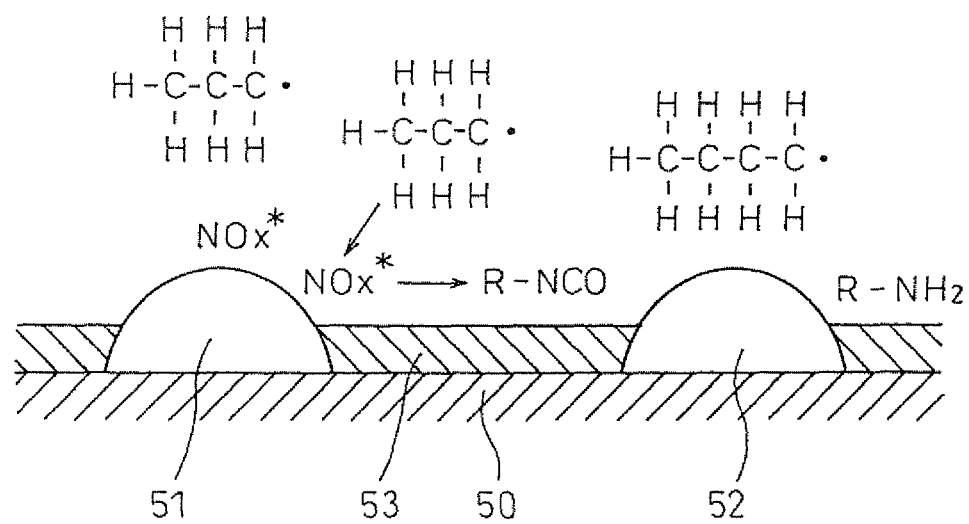

Furthermore, at this time, a large amount of reducing intermediate which contains nitrogen and hydrocarbons continues to be held or adsorbed on the surface of the basic layer 53, that is, on the basic exhaust gas flow surface part 54 of the exhaust purification catalyst 13. It is learned that this reducing intermediate plays a central role in obtaining a high $NO_x$ purification rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons which flow into the exhaust purification catalyst 13 is made to vibrate by within a predetermined range of amplitude and within a predetermined range of period.

FIG. 6A shows when the concentration of hydrocarbons which flow into the exhaust purification catalyst 13 is low, while FIG. 6B shows when hydrocarbons are fed from the hydrocarbon feed valve 15 and the concentration of hydrocarbons which flow into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. Therefore, the NO which is contained in the exhaust gas, as shown in FIG. 6A, is oxidized on the platinum 51 and becomes $NO_2$. Next, this $NO_2$ is further oxidized and becomes $NO_3$. Further part of the $NO_2$ becomes $NO_2^-$. In this case, the amount of production of $NO_3$ is far greater than the amount of production of $NO_2^-$. Therefore, on the platinum Pt 51, a large amount of $NO_3$ and a small amount of $NO_2^-$ are produced. These $NO_3$ and $NO_2^-$ are strong in activity. Below, these $NO_3$ and $NO_2^-$ will be referred to as the active $NO_x^*$.

On the other hand, if hydrocarbons are fed from the hydrocarbon feed valve 15, as shown in FIG. 3, the hydrocarbons are reformed and become radicalized inside of the exhaust purification catalyst 13. As a result, as shown in FIG. 6B, the hydrogen concentration around the active $NO_x^*$ becomes higher. In this regard, if, after the active $NO_x^*$ is produced, the state of a high oxygen concentration around the active $NO_x^*$ continues for a constant time or more, the active $NO_x^*$ is oxidized and is absorbed in the form of nitrate ions $NO_3^-$ inside the basic layer 53. However, if, before this constant time elapses, the hydrocarbon concentration around the active $NO_x^*$ becomes higher, as shown in FIG. 6B, the active $NO_x^*$ reacts on the platinum 51 with the radical hydrocarbons HC to thereby form the reducing intermediate. This reducing intermediate is adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO becomes an amine compound R—$NH_2$ if hydrolyzed. However, in this case, what is hydrolyzed is considered to be part of the isocyanate compound R—NCO. Therefore, as shown in FIG. 6B, the majority of the reducing intermediate which is held or adsorbed on the surface of the basic layer 53 is believed to be the isocyanate compound R—NCO and amine compound R—$NH_2$.

On the other hand, as shown in FIG. 6B, if the produced reducing intermediate is surrounded by the hydrocarbons HC, the reducing intermediate is blocked by the hydrocarbons HC and the reaction will not proceed any further. In this case, if the concentration of hydrocarbons which flow into the exhaust purification catalyst 13 is lowered and thereby the oxygen concentration becomes higher, the hydrocarbons around the reducing intermediate will be oxidized. As a result, as shown in FIG. 6A, the reducing intermediate and the active $NO_x^*$ react. At this time, the active $NO_x^*$ reacts with the reducing intermediate R—NCO or R—NH$_2$ to become N$_2$, CO$_2$, H$_2$O, therefore the NO$_x$ is removed.

In this way, in the exhaust purification catalyst 13, by making the concentration of hydrocarbons which flow into the exhaust purification catalyst 13 higher, a reducing intermediate is produced. The concentration of hydrocarbons which flow into the exhaust purification catalyst 13 is lowered and the oxygen concentration is raised so that the active NO$_x$* reacts with the reducing intermediate and the NO$_x$ is removed. That is, in order for the exhaust purification catalyst 13 to remove the NO$_x$, the concentration of hydrocarbons which flow into the exhaust purification catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the active NO$_x$*. That is, it is necessary to make the concentration of hydrocarbons which flow into the exhaust purification catalyst 13 vibrate by within a predetermined range of amplitude. Note that, in this case, it is necessary to hold a sufficient amount of reducing intermediate R—NCO or R—NH$_2$ on the basic layer 53, that is, the basic exhaust gas flow surface part 24, until the produced reducing intermediate reacts with the active NO$_x$*. For this reason, the basic exhaust gas flow surface part 24 is provided.

On the other hand, if lengthening the feed period of the hydrocarbons, the time in which the oxygen concentration becomes higher becomes longer in the period after the hydrocarbons are fed until the hydrocarbons are next fed. Therefore, the active NO$_x$* is absorbed in the basic layer 53 in the form of nitrates without producing a reducing intermediate. To avoid this, it is necessary to make the concentration of hydrocarbons which flow into the exhaust purification catalyst 13 vibrate by within a predetermined range of period.

Therefore, in an embodiment of the present invention, to make the NO$_x$ contained in the exhaust gas and the reformed hydrocarbons react and produce the reducing intermediate R—NCO or R—NH$_2$ containing nitrogen and hydrocarbons, the precious metal catalysts 51 and 52 are carried on the exhaust gas flow surface of the exhaust purification catalyst 13. To hold the produced reducing intermediate R—NCO or R—NH$_2$ inside the exhaust purification catalyst 13, a basic exhaust gas flow surface part 54 is formed around the precious metal catalysts 51 and 52. NO$_x$ is reduced by the reducing action of the reducing intermediate R—NCO or R—NH$_2$ held on the basic exhaust gas flow surface part 54, and the vibration period of the hydrocarbon concentration is made the vibration period required for continuation of the production of the reducing intermediate R—NCO or R—NH$_2$. Incidentally, in the example shown in FIG. 4, the injection interval is made 3 seconds.

Figure 7A:
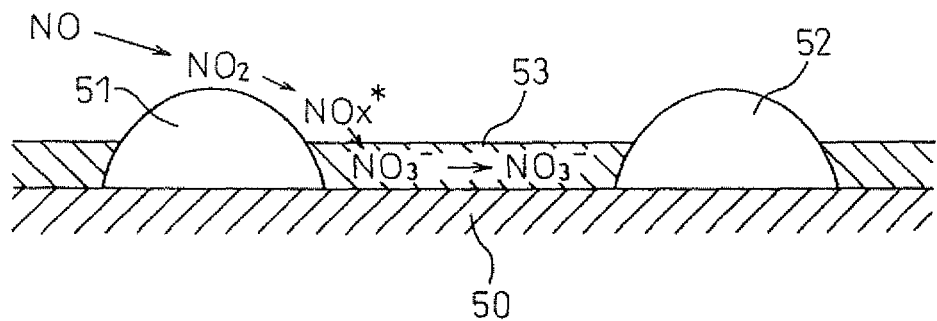
FIGS. 7A and 7B are views for explaining an oxidation reduction reaction in an exhaust purification catalyst.

If the vibration period of the hydrocarbon concentration, that is, the feed period of the hydrocarbons HC, is made longer than the above predetermined range of period, the reducing intermediate R—NCO or R—NH$_2$ disappears from the surface of the basic layer 53. At this time, the active NO$_x$* which is produced on the platinum Pt 53, as shown in FIG. 7A, diffuses in the basic layer 53 in the form of nitrate ions NO$_3^-$ and becomes nitrates. That is, at this time, the NO$_x$ in the exhaust gas is absorbed in the form of nitrates inside of the basic layer 53.

Figure 7B:
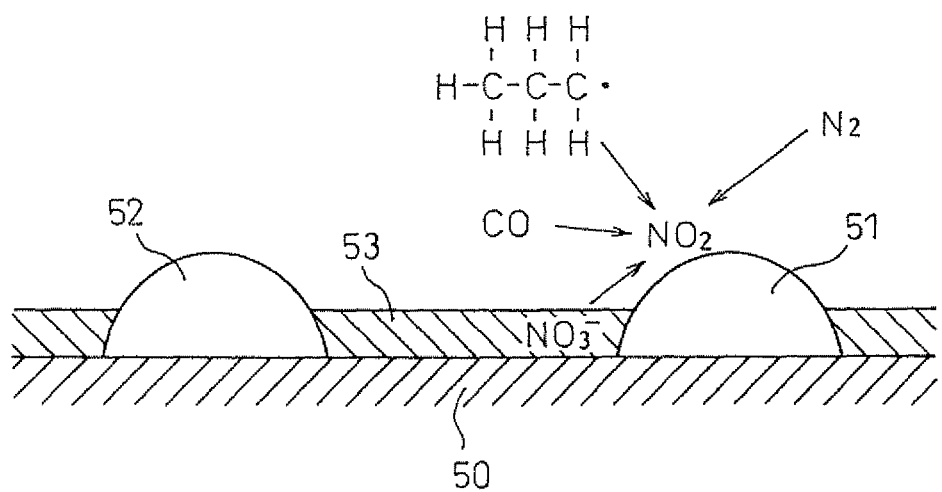

On the other hand, FIG. 7B shows the case where the air-fuel ratio of the exhaust gas which flows into the exhaust purification catalyst 13 is made the stoichiometric air-fuel ratio or rich when the NO$_x$ is absorbed in the form of nitrates inside of the basic layer 53. In this case, the oxygen concentration in the exhaust gas falls, so the reaction proceeds in the opposite direction (NO$_3^-$→NO$_2$), and consequently the nitrates absorbed in the basic layer 53 become nitrate ions NO$_3^-$ one by one and, as shown in FIG. 7B, are released from the basic layer 53 in the form of NO$_2$. Next, the released NO$_2$ is reduced by the hydrocarbons HC and CO contained in the exhaust gas.

Figure 8:
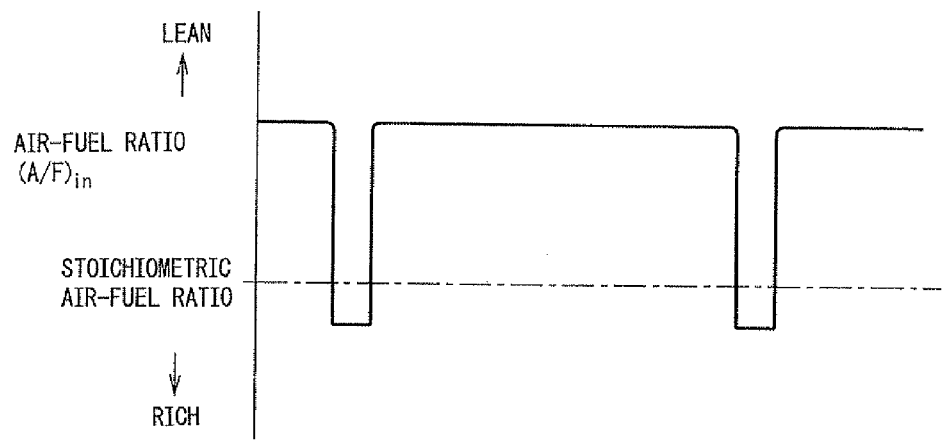
FIG. 8 is a view which shows a change of an air-fuel ratio of exhaust gas flowing into an exhaust purification catalyst.

FIG. 8 shows the case of making the air-fuel ratio (A/F) in of the exhaust gas which flows into the exhaust purification catalyst 13 temporarily rich slightly before the NO$_x$ absorption ability of the basic layer 53 becomes saturated. Note that, in the example shown in FIG. 8, the time interval of this rich control is 1 minute or more. In this case, the NO$_x$ which was absorbed in the basic layer 53 when the air-fuel ratio (A/F) in of the exhaust gas was lean is released all at once from the basic layer 53 and reduced when the air-fuel ratio (A/F) in of the exhaust gas is made temporarily rich. Therefore, in this case, the basic layer 53 plays the role of an absorbent for temporarily absorbing NO$_x$.

Note that, at this time, sometimes the basic layer 53 temporarily adsorbs the NO$_x$. Therefore, if using term of storage as a term including both absorption and adsorption, at this time, the basic layer 53 performs the role of an NO$_x$ storage agent for temporarily storing the NO$_x$. That is, in this case, if the ratio of the air and fuel (hydrocarbons) which are supplied into the engine intake passage, combustion chambers 2, and exhaust passage upstream of the exhaust purification catalyst 13 is referred to as the air-fuel ratio of the exhaust gas, the exhaust purification catalyst 13 functions as an NO$_x$ storage catalyst which stores the NO$_x$ when the air-fuel ratio of the exhaust gas is lean and releases the stored NO$_x$ when the oxygen concentration in the exhaust gas falls.

Figure 9:
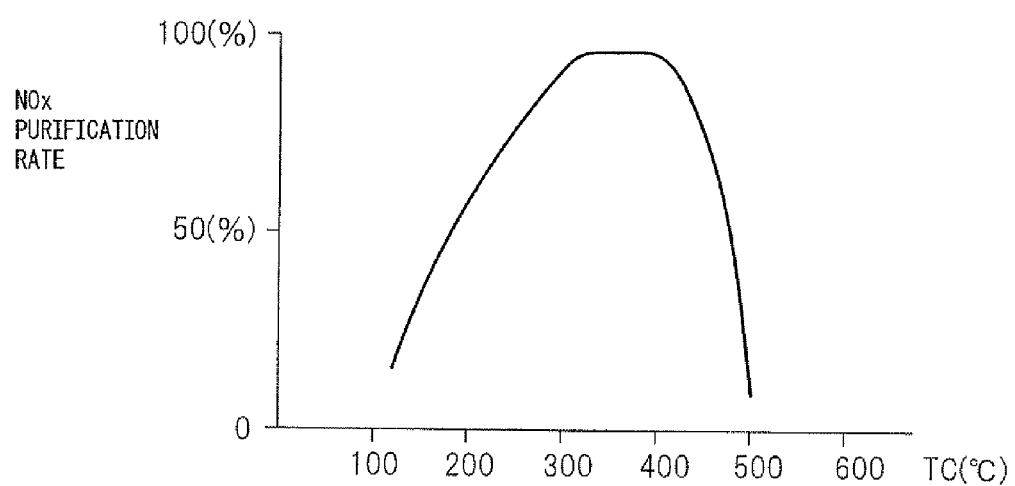
FIG. 9 is a view of an $NO_x$ purification rate.

FIG. 9 shows the NO$_x$ purification rate when making the exhaust purification catalyst 13 function as an NO$_x$ storage catalyst in this way. Note that, the abscissa of the FIG. 9 shows the catalyst temperature TC of the exhaust purification catalyst 13. When making the exhaust purification catalyst 13 function as an NO$_x$ storage catalyst, as shown in FIG. 9, when the catalyst temperature TC is 300° C. to 400° C., an extremely high NO$_x$ purification rate is obtained, but when the catalyst temperature TC becomes a 400° C. or higher high temperature, the NO$_x$ purification rate falls.

In this way, when the catalyst temperature TC becomes 400° C. or more, the NO$_x$ purification rate falls because if the catalyst temperature TO becomes 400° C. or more, the nitrates break down by heat and are released in the form of NO$_2$ from the exhaust purification catalyst 13. That is, so long as storing NO$_x$ in the form of nitrates, when the catalyst temperature TC is high, it is difficult to obtain a high NO$_x$ purification rate. However, in the new NO$_x$ purification method shown from FIG. 4 to FIGS. 6A and 6B, as will be understood from FIGS. 6A and 6B, nitrates are not formed or even if formed are extremely small in amount, consequently, as shown in FIG. 5, even when the catalyst temperature TC is high, a high NO$_x$ purification rate is obtained.

Therefore, in the present invention, a hydrocarbon feed valve 15 for feeding hydrocarbons is arranged in the engine exhaust passage, an exhaust purification catalyst 13 for reacting NO$_x$ contained in exhaust gas and reformed hydrocarbons is arranged in the engine exhaust passage downstream of the hydrocarbon feed valve 15, precious metal catalysts 51 and 52 are carried on the exhaust gas flow surface of the exhaust purification catalyst 13, a basic exhaust gas flow surface part 54 is formed around the precious metal catalysts 51 and 52, the exhaust purification catalyst 13 has the property of reducing the NO$_x$ which is contained in exhaust gas if the concentration of hydrocarbons which flow into the exhaust purification catalyst 13 is made to vibrate by within a predetermined range of amplitude and within a predetermined range of period and has the property of being increased in storage amount of $NO_x$ which is contained in exhaust gas if the vibration period of the hydrocarbon concentration is made longer than this predetermined range, and, at the time of engine operation, the concentration of hydrocarbons which flow into the exhaust purification catalyst 13 is made to vibrate by within the predetermined range of amplitude and within the predetermined range of period to thereby reduce the $NO_x$ which is contained in the exhaust gas in the exhaust purification catalyst 13.

That is, the $NO_x$ purification method which is shown from FIG. 4 to FIGS. 6A and 6B can be said to be a new $NO_x$ purification method designed to remove $NO_x$ without forming almost any nitrates in the case of using an exhaust purification catalyst which carries precious metal catalysts and forms a basic layer which can absorb $NO_x$. In actuality, when using this new $NO_x$ purification method, the nitrates which are detected from the basic layer 53 become much smaller in amount compared with the case where making the exhaust purification catalyst 13 function as an $NO_x$ storage catalyst. Note that, this new $NO_x$ purification method will be referred to below as the first $NO_x$ purification method.

Next, referring to FIG. 10 to FIG. 15, this first NO purification method will be explained in a bit more detail.

Figure 10:
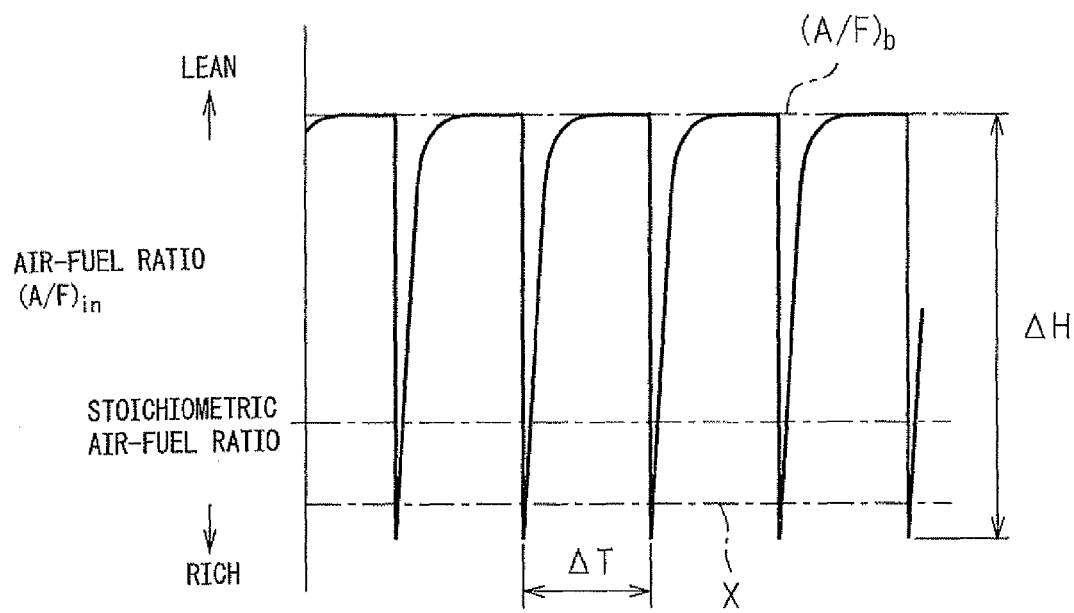
FIG. 10 is a time chart which shows a change of an air-fuel ratio of exhaust gas flowing into an exhaust purification catalyst.

FIG. 10 shows enlarged the change in the air-fuel ratio (A/F) in shown in FIG. 4. Note that, as explained above, the change in the air-fuel ratio (A/F) in of the exhaust gas which flows into this exhaust purification catalyst 13 simultaneously shows the change in concentration of the hydrocarbons which flow into the exhaust purification catalyst 13. Note that, in FIG. 10, ΔH shows the amplitude of the change in concentration of hydrocarbons HC which flow into the exhaust purification catalyst 13, while ΔT shows the vibration period of the concentration of the hydrocarbons which flow into the exhaust purification catalyst 13.

Furthermore, in FIG. 10, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the exhaust purification catalyst 13 when stopping the feed of hydrocarbons. On the other hand, in FIG. 10, X shows the upper limit of the air-fuel ratio (A/F) in used for producing the reducing intermediate without the produced active $NO_x^*$ being stored in the form of nitrates inside the basic layer 53 much at all. To make the active $NO_x^*$ and the reformed hydrocarbons react to produce a reducing intermediate, the air-fuel ratio (A/F) in has to be made lower than this upper limit X of the air-fuel ratio.

In other words, in FIG. 10, X shows the lower limit of the concentration of hydrocarbons required for making the active $NO_x^*$ and reformed hydrocarbons react to produce a reducing intermediate. To produce the reducing intermediate, the concentration of hydrocarbons has to be made higher than this lower limit X. In this case, whether the reducing intermediate is produced is determined by the ratio of the oxygen concentration and hydrocarbon concentration around the active $NO_x^*$, that is, the air-fuel ratio (A/F) in. The upper limit X of the air-fuel ratio required for producing the reducing intermediate will below be called the demanded minimum air-fuel ratio.

In the example shown in FIG. 10, the demanded minimum air-fuel ratio X is rich, therefore, in this case, to form the reducing intermediate, the air-fuel ratio (A/F) in is instantaneously made the demanded minimum air-fuel ratio X or less, that is, rich. As opposed to this, in the example shown in FIG. 11, the demanded minimum air-fuel ratio X is lean. In this case, the air-fuel ratio (A/F) in is maintained lean while periodically reducing the air-fuel ratio (A/F) in so as to form the reducing intermediate.

In this case, whether the demanded minimum air-fuel ratio X becomes rich or becomes lean depends on the oxidizing strength of the exhaust purification catalyst 13. In this case, the exhaust purification catalyst 13, for example, becomes stronger in oxidizing strength if increasing the carried amount of the precious metal 51 and becomes stronger in oxidizing strength if strengthening the acidity. Therefore, the oxidizing strength of the exhaust purification catalyst 13 changes due to the carried amount of the precious metal 51 or the strength of the acidity.

Figure 11:
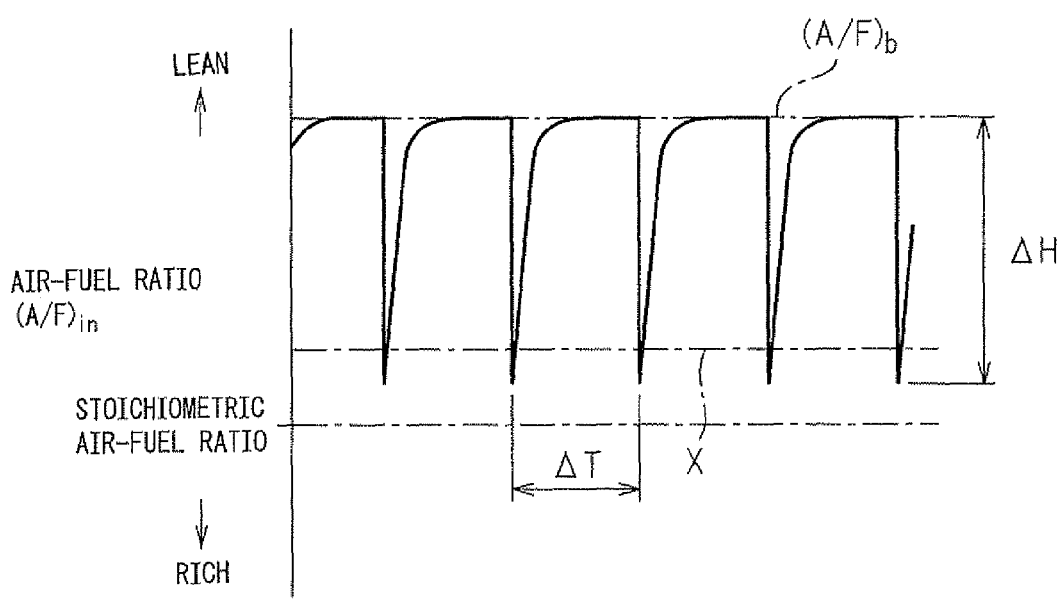
FIG. 11 is a time chart which shows a change of an air-fuel ratio of exhaust gas flowing into an exhaust purification catalyst.

Now, if using an exhaust purification catalyst 13 with a strong oxidizing strength, as shown in FIG. 11, if maintaining the air-fuel ratio (A/F) in lean while periodically lowering the air-fuel ratio (A/F) in, the hydrocarbons end up becoming completely oxidized when the air-fuel ratio (A/F) in is reduced. As a result, a reducing intermediate can no longer be produced. As opposed to this, when using an exhaust purification catalyst 13 with a strong oxidizing strength, as shown in FIG. 10, if making the air-fuel ratio (A/F) in periodically rich, when the air-fuel ratio (A/F) in is made rich, part of the hydrocarbons will not be completely oxidized, but will be partially oxidized, that is, the hydrocarbons will be reformed, consequently a reducing intermediate will be produced. Therefore, when using an exhaust purification catalyst 13 with a strong oxidizing strength, the demanded minimum air-fuel ratio X has to be made rich.

On the other hand, when using an exhaust purification catalyst 13 with a weak oxidizing strength, as shown in FIG. 11, if maintaining the air-fuel ratio (A/F) in lean while periodically lowering the air-fuel ratio (A/F) in, part of the hydrocarbons will not be completely oxidized, but will be partially oxidized, that is, the hydrocarbons will be reformed, and consequently a reducing intermediate will be produced. As opposed to this, when using an exhaust purification catalyst 13 with a weak oxidizing strength, as shown in FIG. 10, if making the air-fuel ratio (A/F) in periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing strength, the demanded minimum air-fuel ratio X has to be made lean.

Figure 12:
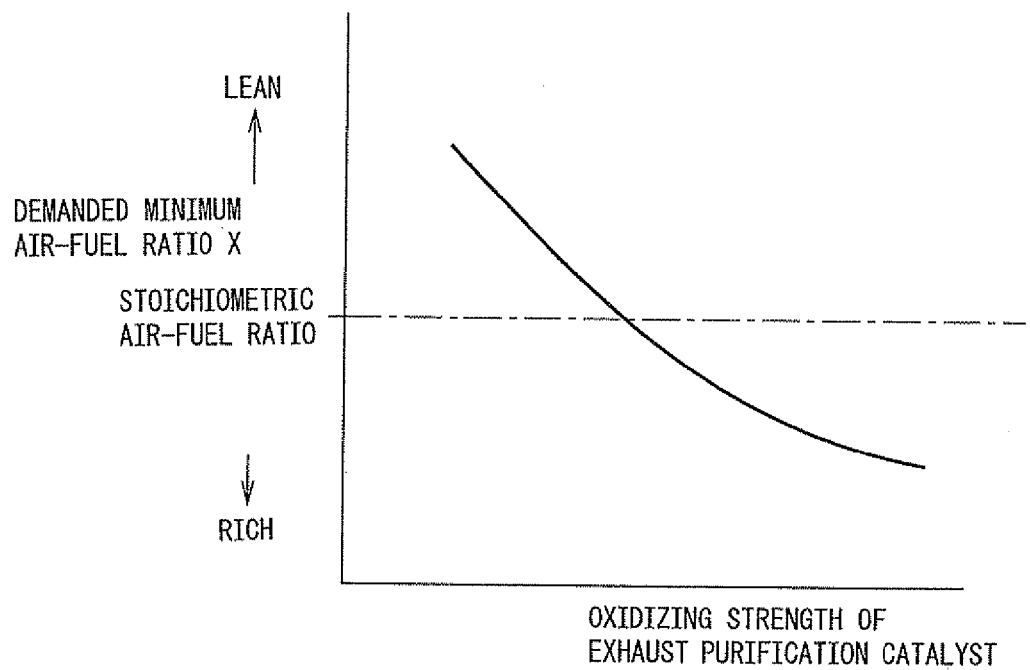
FIG. 12 is a view which shows a relationship between an oxidizing strength of an exhaust purification catalyst and a requested minimum air-fuel ratio X.

That is, it is learned that the demanded minimum air-fuel ratio X, as shown in FIG. 12, has to be reduced the stronger the oxidizing strength of the exhaust purification catalyst 13. In this way the demanded minimum air-fuel ratio X becomes lean or rich due to the oxidizing strength of the exhaust purification catalyst 13. Below, taking as example the case where the demanded minimum air-fuel ratio X is rich, the amplitude of the change in concentration of hydrocarbons which flow into the exhaust purification catalyst 13 and the vibration period of the concentration of hydrocarbons which flow into the exhaust purification catalyst 13 will be explained.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F) in the demanded minimum air-fuel ratio X or less increases and along with this the excess amount of hydrocarbons which do not contribute to the production of the reducing intermediate also increases. In this case, to remove the $NO_x$ well, as explained above, it is necessary to make the excess hydrocarbons oxidize. Therefore, to remove the $NO_x$ well, the larger the amount of excess hydrocarbons, the larger the amount of oxygen which is required.

In this case, if raising the oxygen concentration in the exhaust gas, the amount of oxygen can be increased. Therefore, to remove the $NO_x$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 13:
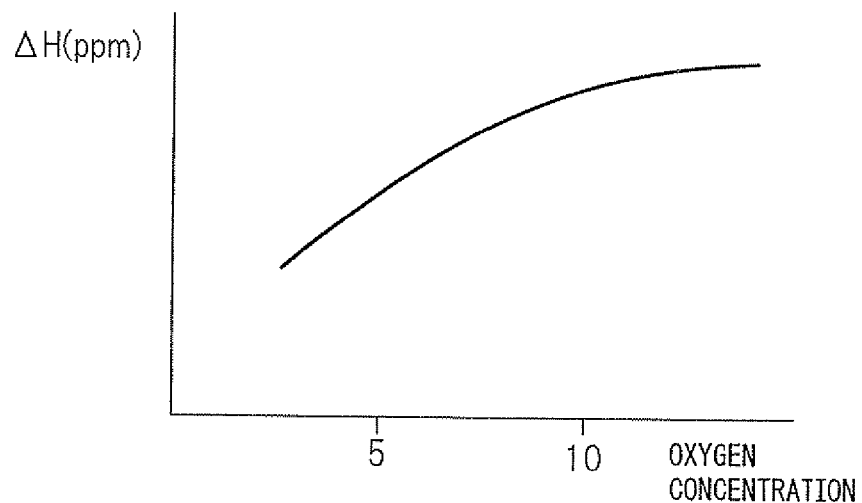
FIG. 13 is a view which shows a relationship between an oxygen concentration in exhaust gas and an amplitude ΔH of a hydrocarbon concentration giving the same $NO_x$ purification rate.

FIG. 13 shows the relationship between the oxygen concentration in the exhaust gas before the hydrocarbons are fed and the amplitude $\Delta H$ of the hydrocarbon concentration when the same $NO_x$ purification rate is obtained. To obtain the same $NO_x$ purification rate, from FIG. 13, it is learned that the higher the oxygen concentration in the exhaust gas before the hydrocarbons are fed, the greater the amplitude $\Delta H$ of the hydrocarbon concentration has to be made. That is, to obtain the same $NO_x$ purification rate, the higher the base air-fuel ratio $(A/F)_b$, the greater the amplitude $\Delta T$ of the hydrocarbon concentration has to be made. In other words, to remove the $NO_x$ well, the lower the base air-fuel ratio (A/F)b, the more the amplitude $\Delta T$ of the hydrocarbon concentration can be reduced.

Figure 14:
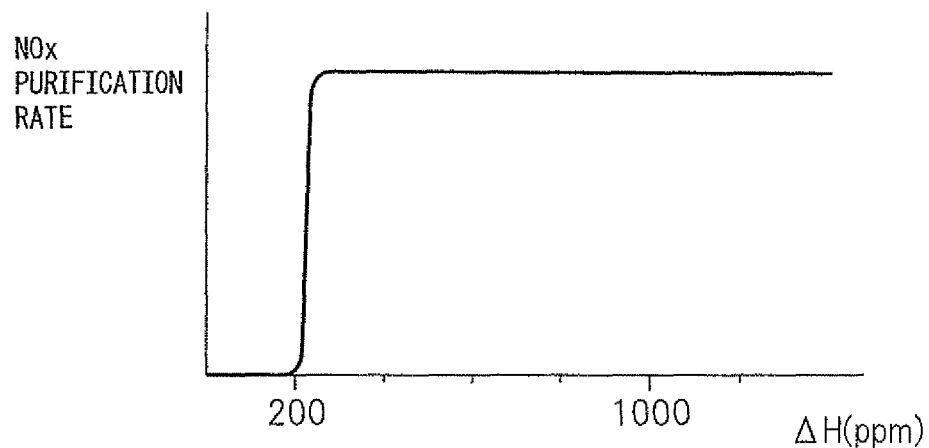
FIG. 14 is a view which shows a relationship between an amplitude ΔH of a hydrocarbon concentration and an $NO_x$ purification rate.

In this regard, the base air-fuel ratio (A/F)b becomes the lowest at the time of an acceleration operation. At this time, if the amplitude $\Delta H$ of the hydrocarbon concentration is about 200 ppm, it is possible to remove the $NO_x$ well. The base air-fuel ratio (A/F)b is normally larger than the time of acceleration operation. Therefore, as shown in FIG. 14, if the amplitude $\Delta H$ of the hydrocarbon concentration is 200 ppm or more, an excellent $NO_x$ purification rate can be obtained.

On the other hand, it is learned that when the base air-fuel ratio $(A/F)_b$ is the highest, if making the amplitude $\Delta H$ of the hydrocarbon concentration 10000 ppm or so, an excellent $NO_x$ purification rate is obtained. Therefore, in the present invention, the predetermined range of the amplitude of the hydrocarbon concentration is made 200 ppm to 10000 ppm.

Figure 15:
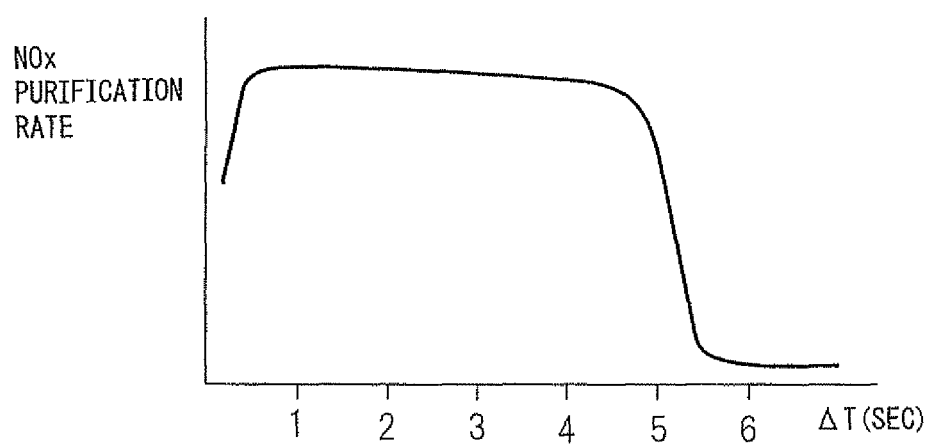
FIG. 15 is a view which shows a relationship of a vibration period ΔT of a hydrocarbon concentration and an $NO_x$ purification rate.

Further, if the vibration period $\Delta T$ of the hydrocarbon concentration becomes longer, the oxygen concentration around the active $NO_x^*$ becomes higher in the time period after the hydrocarbons are fed to when the hydrocarbons are next fed. In this case, if the vibration period $\Delta T$ of the hydrocarbon concentration becomes longer than about 5 seconds, the majority of the active $NO_x^*$ starts to be absorbed in the form of nitrates inside the basic layer 53. Therefore, as shown in FIG. 15, if the vibration period $\Delta T$ of the hydrocarbon concentration becomes longer than about 5 seconds, the $NO_x$ purification rate falls. Therefore, the vibration period $\Delta T$ of the hydrocarbon concentration has to be made 5 seconds or less.

On the other hand, if the vibration period $\Delta T$ of the hydrocarbon concentration becomes about 0.3 second or less, the fed hydrocarbons start to build up on the exhaust gas flow surface of the exhaust purification catalyst 13, therefore, as shown in FIG. 15, if the vibration period $\Delta T$ of the hydrocarbon concentration becomes about 0.3 second or less, the $NO_x$ purification rate falls. Therefore, in the present invention, the vibration period of the hydrocarbon concentration is made from 0.3 second to 5 seconds.

Next, referring to FIG. 16 to FIG. 19, an $NO_x$ purification method in the case when making the exhaust purification catalyst 13 function as an $NO_x$ storage catalyst will be explained in detail. The $NO_x$ purification method in the case when making the exhaust purification catalyst 13 function as an $NO_x$ storage catalyst in this way will be referred to below as the second $NO_x$ purification method.

Figure 16:
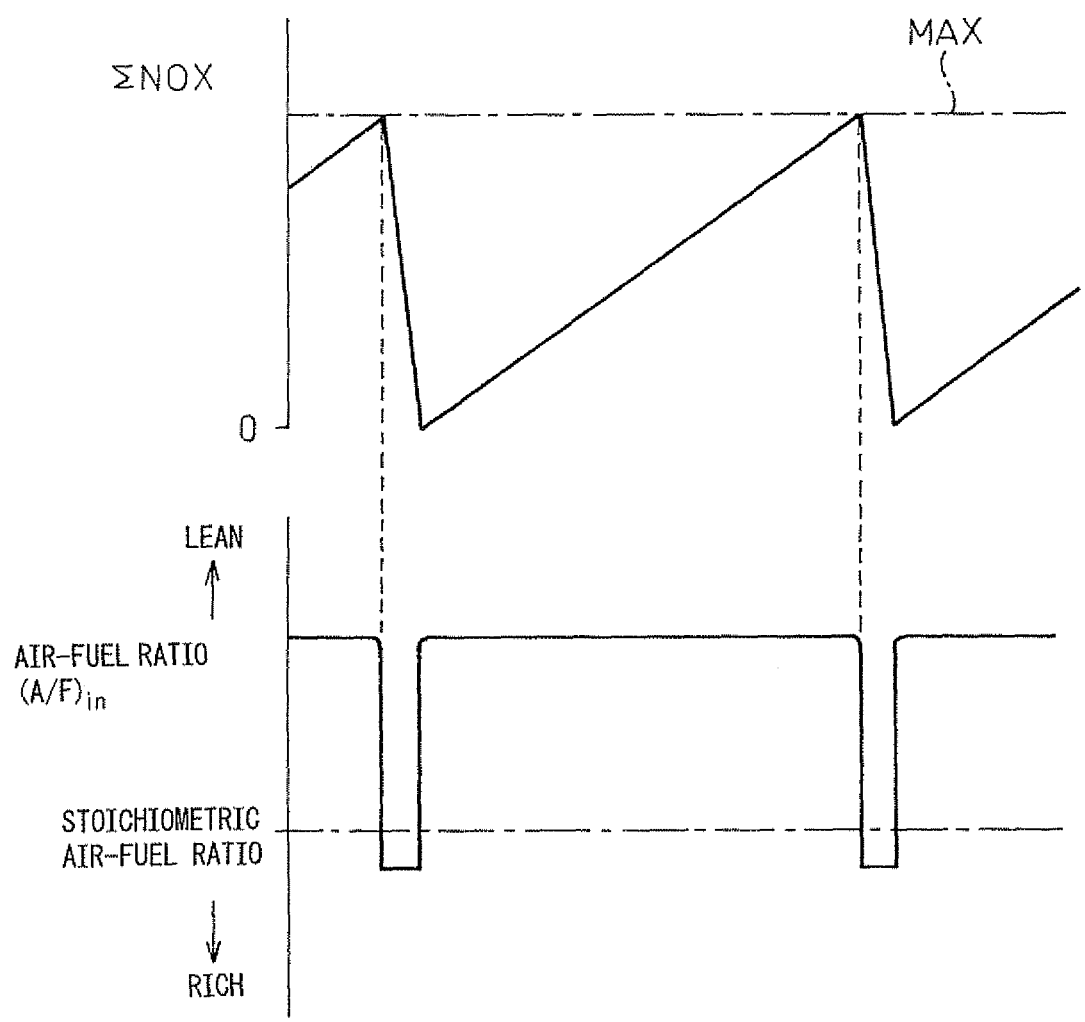
FIG. 16 is a view which shows a change in the air-fuel ratio of the exhaust gas which flows to the exhaust purification catalyst etc.

In this second $NO_x$ purification method, as shown in FIG. 16, when the stored $NO_x$ amount $\Sigma NOx$ of $NO_x$ which is stored in the basic layer 53 exceeds a predetermined allowable amount MAX, the air-fuel ratio (A/F) in of the exhaust gas flowing into the exhaust purification catalyst 13 is temporarily made rich. If the air-fuel ratio (A/F) in of the exhaust gas is made rich, the $NO_x$ which was stored in the basic layer 53 when the air-fuel ratio (A/F) in of the exhaust gas was lean is released from the basic layer 53 all at once and reduced. Due to this, the $NO_x$ is removed.

Figure 17:
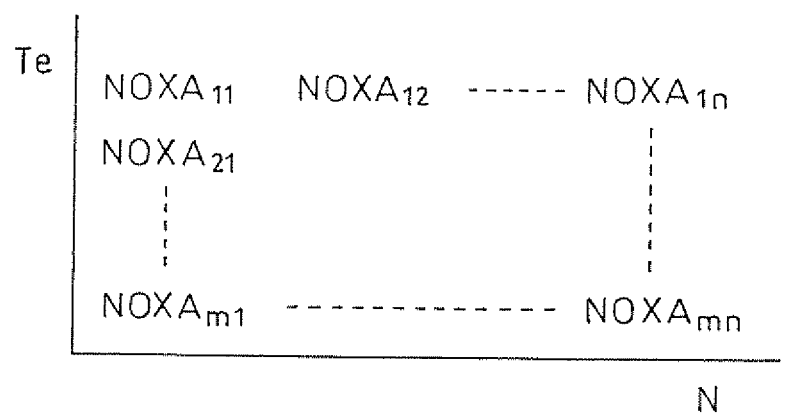
FIG. 17 is a view which shows a map of an exhausted $NO_x$ amount NOXA.

The stored $NO_x$ amount $\Sigma NOx$ is, for example, calculated from the amount of $NO_x$ which is exhausted from the engine. In this embodiment according to the present invention, the exhausted $NO_x$ amount NOXA of $NO_x$ which is exhausted from the engine per unit time is stored as a function of the engine output torque Te and engine speed N in the form of a map such as shown in FIG. 17 in advance in the ROM 32. The stored $NO_x$ amount $\Sigma NOx$ is calculated from the exhausted $NO_x$ amount NOXA. In this case, as explained before, the period during which the air-fuel ratio (A/F) in of the exhaust gas is made rich is usually 1 minute or more.

Figure 18:
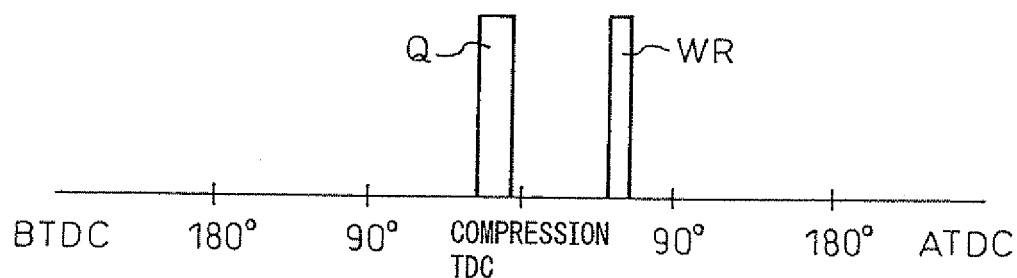
FIG. 18 is a view which shows a fuel injection timing.
Figure 19:
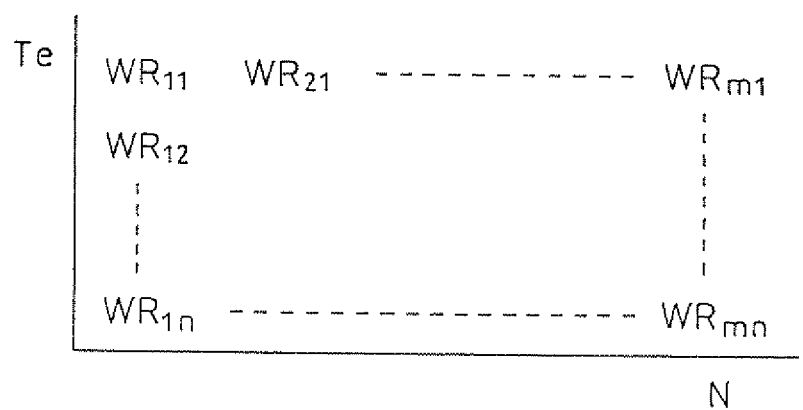
FIG. 19 is a view which shows a map of an additional fuel amount WR.

In this second $NO_x$ purification method, as shown in FIG. 18, the fuel injector 3 injects additional fuel WR into the combustion chamber 2, in addition to the output generation-use fuel Q so that the air-fuel ratio (A/F) in of the exhaust gas which flows into the exhaust purification catalyst 13 is made rich. Note that, in FIG. 18, the abscissa indicates the crank angle. This additional fuel WR is injected at a timing at which it will burn, but will not appear as engine output, that is, slightly before ATDC90° after compression top dead center. This fuel amount WR is stored as a function of the engine output torque Te and engine speed N in the form of a map such as shown in FIG. 19 in advance in the ROM 32. Of course, in this case, it is also possible to make the feed amount of hydrocarbons from the hydrocarbon feed valve 15 increase so as to make the air-fuel ratio (A/F) in of the exhaust gas rich.

Now, returning again to the explanation of the first $NO_x$ purification method, to use the first $NO_x$ purification method to remove the $NO_x$ well as explained before, the amplitude $\Delta H$ and vibration period $\Delta T$ of the hydrocarbon concentration have to be suitably controlled. That is, to use the first $NO_x$ purification method to remove the $NO_x$ well, it is necessary to control the amplitude $\Delta H$ of the hydrocarbon concentration so that the air-fuel ratio (A/F) in of the exhaust gas which flows into the exhaust purification catalyst 13 becomes the demanded minimum air-fuel ratio X or less, and it is necessary to control the vibration period $\Delta T$ of the hydrocarbon concentration to 0.3 second to 5 seconds.

In this case, in the present invention, the amplitude $\Delta H$ of the hydrocarbon concentration is controlled by controlling the injection amount of hydrocarbons from the hydrocarbon feed valve 15 and the vibration period $\Delta T$ of the hydrocarbon concentration is controlled by controlling the injection period of hydrocarbons from the hydrocarbon feed valve 15. In this case, the injection amount of hydrocarbons from the hydrocarbon feed valve 15 can be controlled by controlling at least one of the injection time or injection pressure of hydrocarbons from the hydrocarbon feed valve 15. However, below, the present invention will be explained with reference to the case of controlling the injection amount by controlling the injection time while holding the injection pressure constant.

Now then, in this embodiment according to the present invention, the optimal opening degree of the throttle valve 10 and the optimal opening degree of the EGR control valve 17 in accordance with the operating state of the engine are found in advance by experiments. Furthermore, the optimal base air-fuel ratio (A/F)b which is obtained when the throttle valve 10 and the EGR control valve 17 are made the optimal opening degrees is also found in advance by experiments. In FIG. 20, this optimal base air-fuel ration (A/F)b obtained by experiments is shown as a function of the engine speed N and the engine output torque Te. Note that, the solid lines in FIG. 20A show equivalent air-fuel ratio lines of air-fuel ratios indicated by numeral values.

Figure 20A:
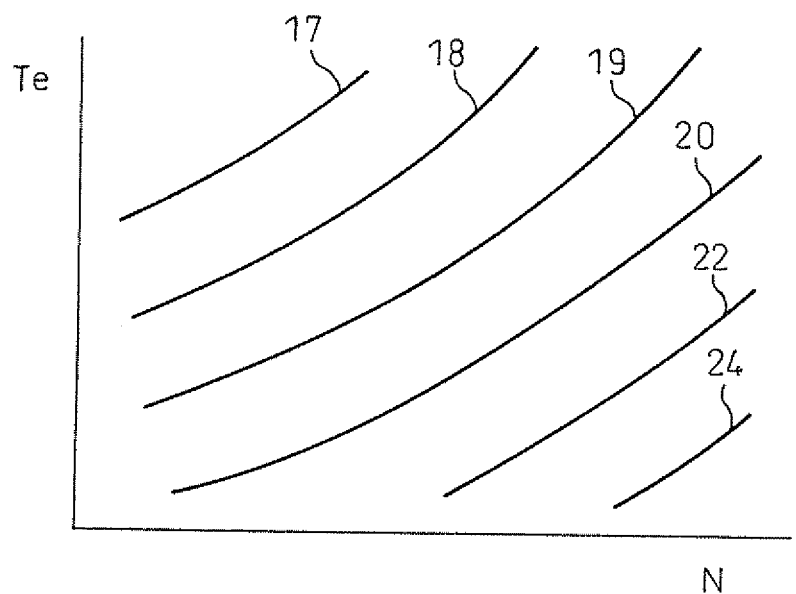
FIGS. 20A and 20B are views which show a target base air-fuel ratio.
Figure 20B:
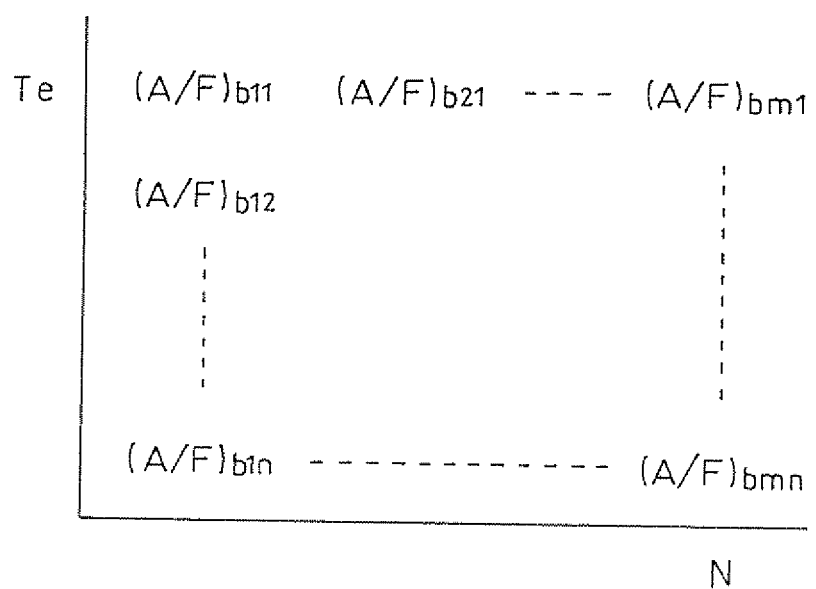

At the time of engine operation, the injection amount of fuel from the fuel injector 3 is controlled so that the air-fuel ratio of the exhaust gas which is exhausted from the engine becomes the optimal base air-fuel ratio (A/F)b shown in FIG. 20A. Note that the optimal base air-fuel ratio (A/F)b shown in FIG. 20A is stored as a function of the engine speed N and the engine output torque Te in the form of a map such as shown in FIG. 20B in advance in the ROM 32.

Figure 21A:
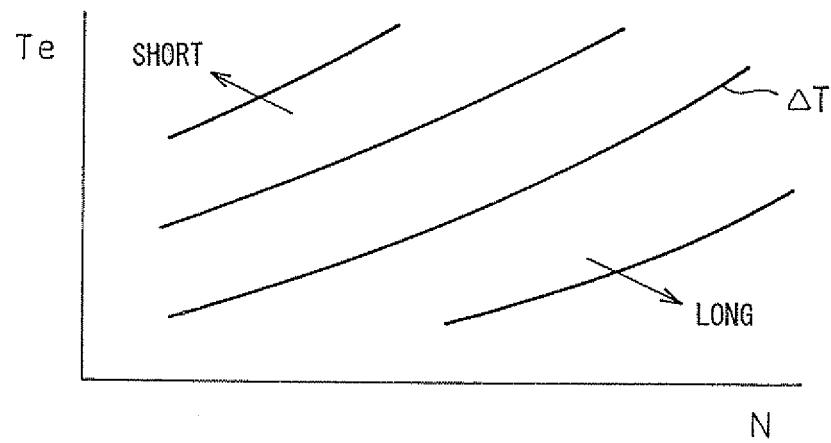
FIGS. 21A, 21B, and 21C are views which show an injection period of hydrocarbons etc.

Further, the optimal hydrocarbon injection period $\Delta T$ and the optimal hydrocarbon injection period WT which give the highest $NO_x$ purification rate when the $NO_x$ purification action by the first $NO_x$ purification method is being performed are found in advance by experiments. In FIG. 21A, this optimal hydrocarbon injection period $\Delta T$ obtained by experiments is shown as a function of the engine speed N and the engine output torque Te. Note that the solid lines in FIG. 21A show equivalent hydrocarbon injection periods. As can be seen from FIG. 21A, the lower the engine speed N, the shorter the optimal hydrocarbon injection period $\Delta T$ and, the higher the engine output torque Te, the shorter the optimal hydrocarbon injection period $\Delta T$.

Figure 21B:
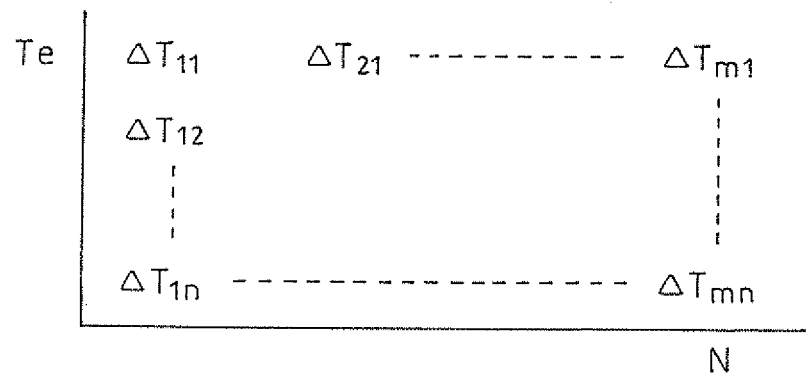

The optimal hydrocarbon injection period $\Delta T$ shown in FIG. 21A is stored as a function of the engine speed N and the engine output torque Te in the form of a map such as shown in FIG. 21B in advance in the ROM 32. In addition, the optimal hydrocarbon injection period WT obtained by experiments is also stored as a function of the engine speed N and the engine output torque Te in the form of a map such as shown in FIG. 21C in advance in the ROM 32.

Figure 21C:
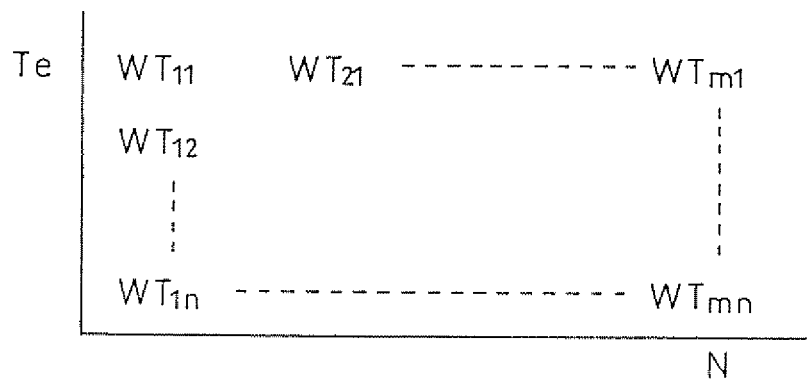
Figure 22A:
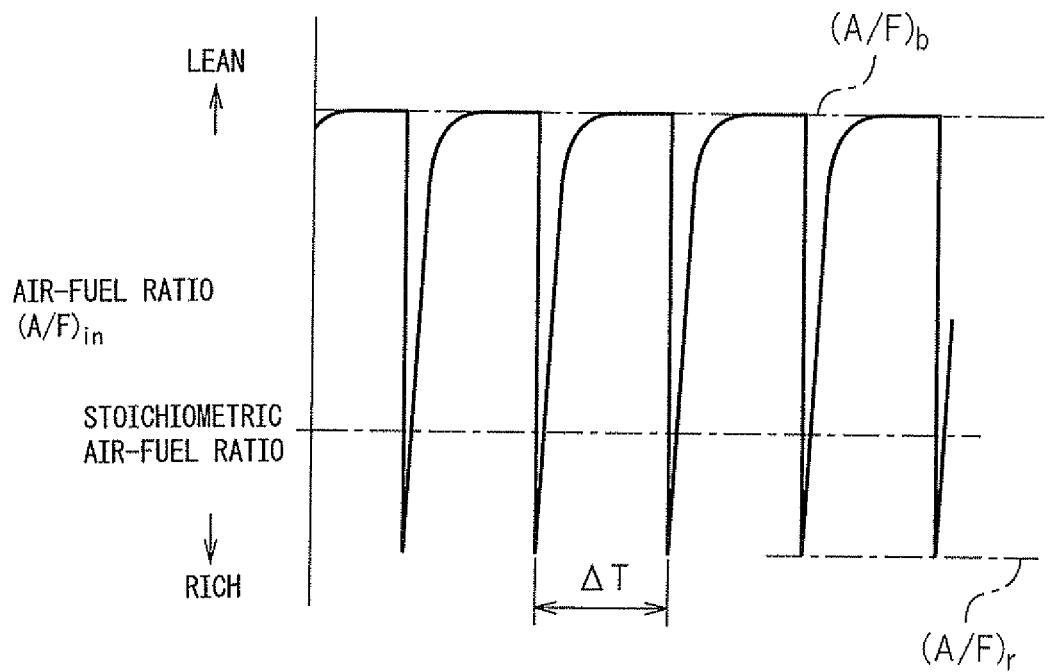
FIGS. 22A and 22B are time charts which show changes in an air-fuel ratio of exhaust gas which flows into an exhaust purification catalyst.
Figure 22B:
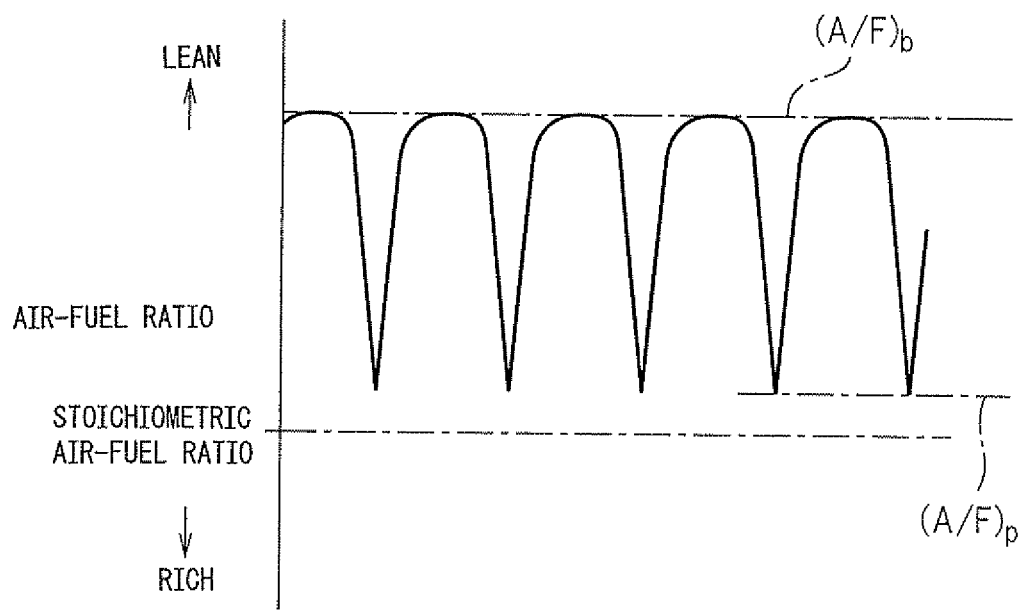

FIG. 22A shows the change of the air-fuel ratio (A/F) in of the exhaust gas which flows into the exhaust purification catalyst 13 when the hydrocarbon injection period is made the optimal hydrocarbon injection period $\Delta T$ shown in FIG. 21B and the hydrocarbon injection period is made the optimal hydrocarbon injection period WT shown in FIG. 21C, while FIG. 22B shows the change of the air-fuel ratio which is detected by the downstream side air-fuel ratio sensor 24 at this time. Note that, FIG. 22B shows the change in the air-fuel ratio when the downstream side air-fuel ratio sensor 24 is not poisoned at all.

As will be understood from FIG. 22A and FIG. 22B, the rich side peak air-fuel ratio (A/F)r of the air-fuel ratio (A/F) in of the exhaust gas which flows into the exhaust purification catalyst 13 is rich, while the rich side peak air-fuel ratio (A/F)p of the air-fuel ratio which is detected by the downstream side air-fuel ratio sensor 24 is lean. This is considered to be because part of the fed hydrocarbons deposits once on the exhaust purification catalyst 13, then evaporates with a time difference, whereby the change in the air-fuel ratio of the exhaust gas which flows out from the exhaust purification catalyst 13 is smoothed, so the peak value of the air-fuel ratio becomes smaller.

Figure 23:
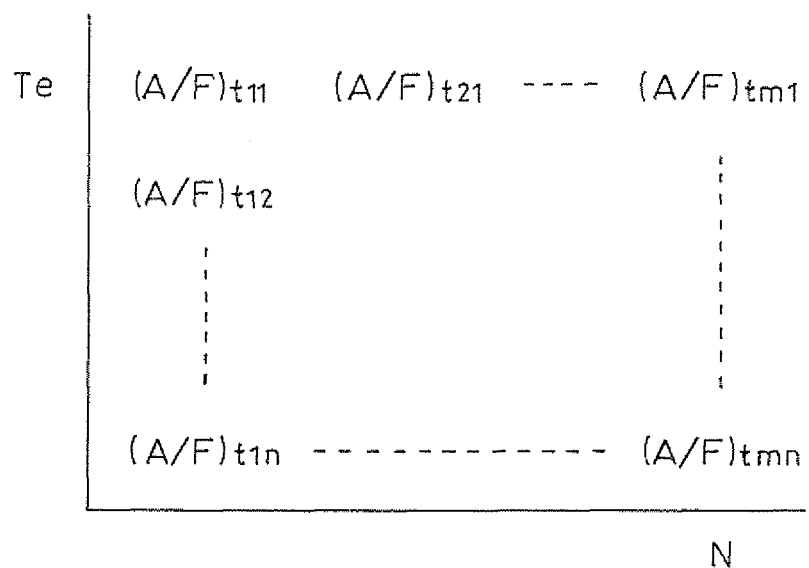
FIG. 23 is a view which shows a map of a target peak air-fuel ratio.

The rich side peak air-fuel ratio (A/F)p detected by the downstream side air-fuel ratio sensor 24 when the hydrocarbon injection period is made the optimal hydrocarbon injection period $\Delta T$ shown in FIG. 21B and the hydrocarbon injection period is made the optimal hydrocarbon injection period WT shown in FIG. 21C is found in advance by experiments. The rich side peak air-fuel ratio (A/F)p which is found in advance by experiments is stored in advance as the target peak air-fuel ratio (A/F)t with respect to the different engine operating states. In this embodiment of the present invention, this target peak air-fuel ratio (A/F)t is stored as a function of the engine speed N and engine output torque Te in the form of a map as shown in FIG. 23 in advance in the ROM 32.

Figure 24A:
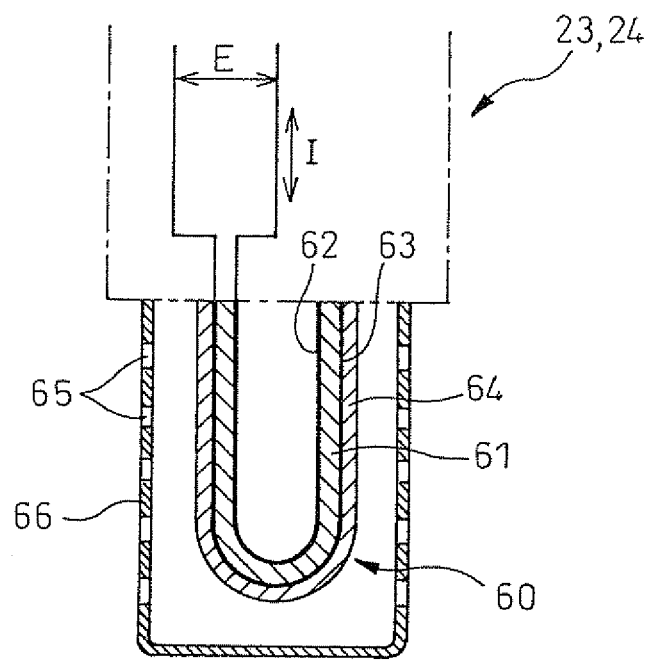
FIGS. 24A and 24B are views which show the structure of a schematically illustrated air-fuel ratio sensor, etc.

Next, the structures of the upstream side air-fuel ratio sensor 23 and the downstream side air-fuel ratio sensor 24 which are used in the present invention will be simply explained. Note that, these upstream side air-fuel ratio sensor 23 and downstream side air-fuel ratio sensor 24 have the same structure. FIG. 24A schematically shows the structures of the air-fuel ratio sensors 23 and 24.

Figure 24B:
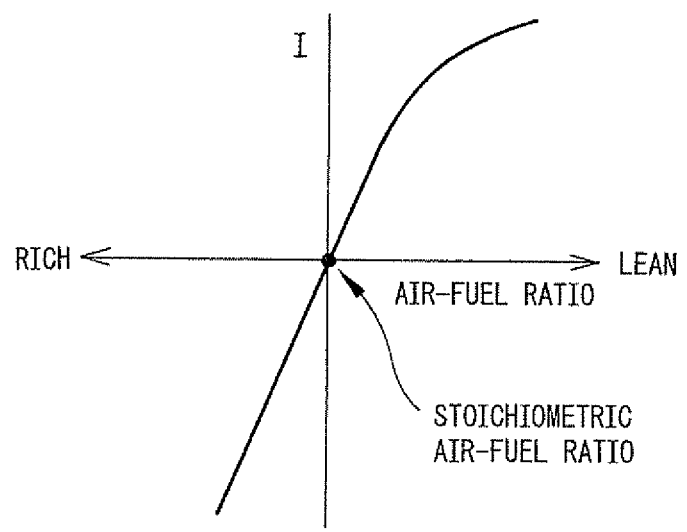

Referring to FIG. 24A, the sensor part 60 of each of the air-fuel ratio sensors 23 and 24 is comprised of a thin walled cup-shaped solid electrolyte 61 made of zirconia Zr, a platinum thin film electrode 62 which covers the inner circumference of the solid electrolyte 61, a platinum thin film electrode 63 which covers the outer circumference of the solid electrolyte 61, and a diffusion resistance layer 64 which is comprised of alumina which covers the surroundings of the electrode 63. This sensor part 60 is covered by a protective cover 66 which has a large number of holes 65. This sensor part 60 is arranged in the exhaust gas. The exhaust gas passes through the holes 65 and is guided to the top of the diffusion resistance layer 64. As shown in FIG. 24A, a constant voltage E is applied across the electrodes 62 and 63. At this time, a current I flows between the electrodes 62 and 63 in accordance with the air-fuel ratio of the exhaust gas as shown in FIG. 24B. In the present invention, the air-fuel ratio is found from this current value I based on the relationship which is shown in FIG. 24B. That is, the air-fuel ratio is detected from the outputs of the air-fuel ratio sensors 23 and 24.

Figure 25A:
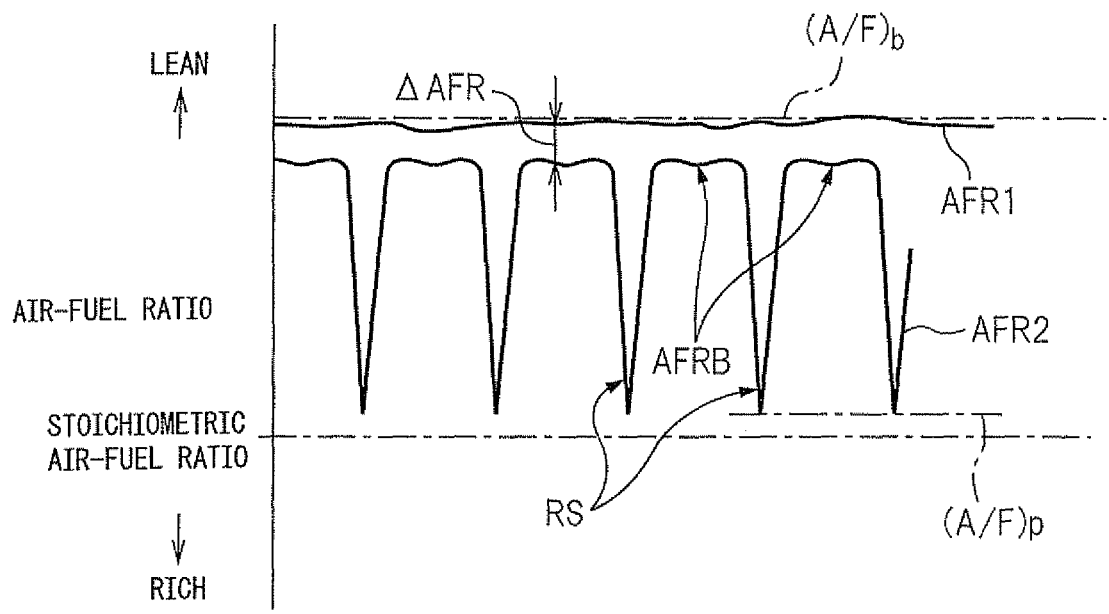
FIGS. 25A and 25B are views which show a change in the air-fuel ratio which is detected by the downstream side air-fuel ratio sensor, etc.

FIG. 25A shows the change in the air-fuel ratio AFR1 of the exhaust gas which is detected by the upstream side air-fuel ratio sensor 23 and the change in the air-fuel ratio AFR2 of the exhaust gas which is detected by the downstream side air-fuel ratio sensor 24 when the $NO_x$ purification action by the first $NO_x$ purification method is being performed. The upstream side air-fuel ratio sensor 23 is positioned at the upstream side of the hydrocarbon feed valve 15, so is not affected by the action of feed of hydrocarbons from the hydrocarbon feed valve 15, therefore, as shown in FIG. 25A, the air-fuel ratio AFR1 of the exhaust gas which is detected by the upstream side air-fuel ratio sensor 23 becomes the base air-fuel ratio (A/F)b.

As opposed to this, the air-fuel ratio AFR2 which is detected by the downstream side air-fuel ratio sensor 24 of the exhaust gas changes in accordance with the feed of hydrocarbons from the hydrocarbon feed valve 15 when such feed occurs. That is, if hydrocarbons are fed from the hydrocarbon feed valve 15, the air-fuel ratio AFR2 which is detected by the downstream side air-fuel ratio sensor 24 changes to the rich side as shown by RS from the reference air-fuel ratio AFRB which is detected when hydrocarbons are not fed from the hydrocarbon feed valve 15. Therefore, if hydrocarbons are fed from the hydrocarbon feed valve 15 at intervals, the air-fuel ratio AFR2 which is detected by the downstream side air-fuel ratio sensor 24, as shown in FIG. 25A, changes to the rich side from the reference air-fuel ratio AFRB at intervals.

In this regard, in this case, as shown in FIG. 25A, it is learned that the air-fuel ratio difference $\Delta$AFR arises between the air-fuel ratio AFR1 which is detected by the upstream side air-fuel ratio sensor 23 and the reference air-fuel ratio AFRB of the air-fuel ratio AFR2 which is detected by the downstream side air-fuel ratio sensor 24 and that the reference air-fuel ratio AFRB of the air-fuel ratio AFR2 which is detected by the downstream side air-fuel ratio sensor 24 becomes the rich side from the air-fuel ratio AFR1 which is detected by the upstream side air-fuel ratio sensor 23. The reason is believed to be as follows:

That is, large molecular weight hydrocarbons like diesel oil are fed from the hydrocarbon feed valve 15. The hydrocarbons which are fed from this hydrocarbon feed valve 15 are oxidized or partially oxidized inside the exhaust purification catalyst 13. However, in actuality, not all of the hydrocarbons which are fed from the hydrocarbon feed valve 15 are oxidized or partially oxidized. Part of the hydrocarbons ends up slipping through the exhaust purification catalyst 13 without being oxidized or partially oxidized. Therefore, the large molecular weight hydrocarbons which slipped through the exhaust purification catalyst 13 flow into the downstream side air-fuel ratio sensor 24.

In this regard, in the air-fuel ratio sensor which is shown in FIG. 24A, the oxygen and hydrocarbons which are contained in the exhaust gas diffuse inside of the diffusion resistance layer 64 to reach the electrode 63, an oxidation action of hydrocarbons is performed on the electrode 63, and, if at this time the oxygen is excessive, the oxygen ions move inside the solid electrolyte 61 from the electrode 63 toward 62, while if at this time the oxygen is insufficient, the oxygen ions move inside the solid electrolyte 61 from the electrode 62 toward 63, and a current I produced due to this is used to detect the air-fuel ratio.

On the other hand, like at the downstream side air-fuel ratio sensor 24, if large molecular weight hydrocarbons flow to the air-fuel ratio sensor, part of the hydrocarbons, as explained above, diffuses inside of the diffusion resistance layer 64 and reaches the electrode 63, but part of the hydrocarbons builds up once on the surface of the diffusion resistance layer 64 due to the large molecular weight. Next, the once built up, large molecular weight hydrocarbons gradually diffuse inside of the diffusion resistance layer 64 and reach the electrode 63. As a result, at the downstream side air-fuel ratio sensor 24, even after the feed of hydrocarbons from the hydrocarbon feed valve 15, it is still judged that the exhaust gas contains a large amount of hydrocarbons, therefore the reference air-fuel ratio AFRB of the air-fuel ratio AFR2 which is detected by the downstream side air-fuel ratio sensor 24 becomes the rich side from the air-fuel ratio AFR1 which is detected by the upstream side air-fuel ratio sensor 23.

Figure 25B:
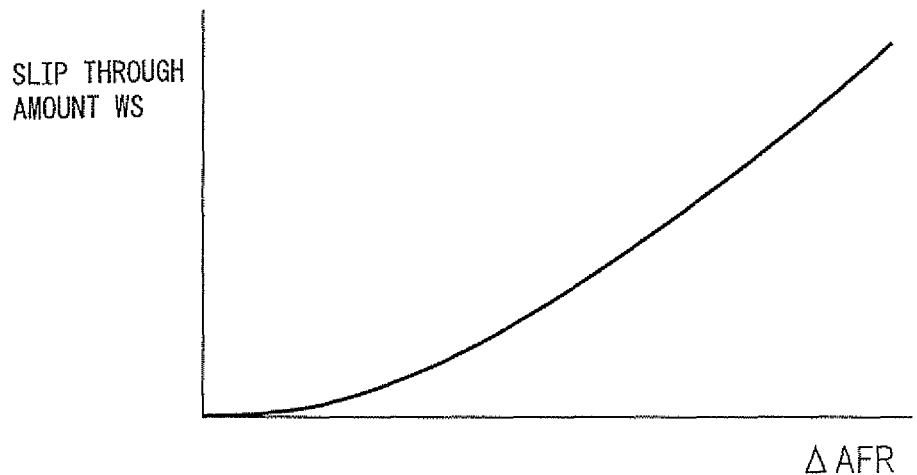

In this case, the more the amount of deposition of hydrocarbons at the downstream side air-fuel ratio sensor 24 increases, the greater the air-fuel ratio difference ΔAFR between the air-fuel ratio AFR1 detected by the upstream side air-fuel ratio sensor 23 and the reference air-fuel ratio AFRB of the air-fuel ratio AFR2 detected by the downstream side air-fuel ratio sensor 24. On the other hand, the greater the amount of hydrocarbons which slip through the exhaust purification catalyst 13, the more the amount of deposition of hydrocarbons at the downstream side air-fuel ratio sensor 24 increases. Therefore, as shown in FIG. 25B, it is learned that the greater the amount WS of hydrocarbons which slip through the exhaust purification catalyst 13, the larger the air-fuel ratio difference ΔAFR. That is, the air-fuel ratio difference ΔAFR can be used as the basis to detect the amount of hydrocarbons which slip through the exhaust purification catalyst 13.

Therefore, in the present invention, a hydrocarbon feed valve 15 for feeding hydrocarbons is arranged in the engine exhaust passage, an upstream side air-fuel ratio sensor 23 for detecting the air-fuel ratio of the exhaust gas is arranged in the engine exhaust passage upstream of the hydrocarbon feed valve 15, an exhaust purification catalyst 13 for reacting $NO_x$ contained in exhaust gas and reformed hydrocarbons is arranged in the engine exhaust passage downstream of the hydrocarbon feed valve 15, a downstream side air-fuel ratio sensor 24 for detecting the air-fuel ratio of the exhaust gas is arranged in the engine exhaust passage downstream of the exhaust purification catalyst 13, the downstream side air-fuel ratio sensor 24 is comprised of a type of sensor which has a solid electrolyte 61, electrodes 62 and 63 respectively covering the two side surfaces of the solid electrolyte 61, and a diffusion resistance layer 64 covering one of electrode 63 and in which exhaust gas is guided on to the diffusion resistance layer 64, precious metal catalysts 51 and 52 are carried on the exhaust gas flow surface of the exhaust purification catalyst 13 and a basic exhaust gas flow surface part 54 is formed around the precious metal catalysts 51 and 52, the exhaust purification catalyst 13 has the property of reducing the $NO_x$ which is contained in exhaust gas if the concentration of hydrocarbons which flow into the exhaust purification catalyst 13 is made to vibrate by within a predetermined range of amplitude and within a predetermined range of period and has the property of being increased in storage amount of $NO_x$ which is contained in exhaust gas if the vibration period of the hydrocarbon concentration is made longer than this predetermined range, when hydrocarbons are fed from the hydrocarbon feed valve 15, the air-fuel ratio which is detected by the downstream side air-fuel ratio sensor 24 changes to the rich side from the reference air-fuel ratio AFRB which is detected when hydrocarbons are not fed from the hydrocarbon feed valve 15, and the amount WS of hydrocarbons which are fed from the hydrocarbon feed valve 15 and which slip through the exhaust purification catalyst 13 is detected from the air-fuel ratio difference ΔAFR between the air-fuel ratio AFR1 detected by the upstream side air-fuel ratio sensor 23 and the reference air-fuel ratio AFRB detected by the downstream side air-fuel ratio sensor 24.

In this case, as shown in FIG. 25A, the amount WS of hydrocarbons which are fed from the hydrocarbon feed valve 15 and which slip through the exhaust purification catalyst 13 becomes larger the larger the air-fuel ratio difference ΔAFR.

Now then, the amount WS of hydrocarbons which slip through the exhaust purification catalyst 13 increases due to various reasons. For example, if the exhaust purification catalyst 13 deteriorates, the ability to partially oxidize or oxidize the hydrocarbons falls, so the amount WS of hydrocarbons which slip through the exhaust purification catalyst 13 increases. Further, the amount WS of hydrocarbons which slip through the exhaust purification catalyst 13 increases even when the feed amount of hydrocarbons from the hydrocarbon feed valve 15 abnormally increases due to some sort of reason.

Therefore, in this embodiment according to the present invention, when the amount WS of hydrocarbons which are fed from the hydrocarbon feed valve 15 and slip through the exhaust purification catalyst 13 exceeds a predetermined limit value, it is judged that the exhaust purification catalyst 13 has deteriorated or there is an abnormality in the amount of injection from the hydrocarbon feed valve 15.

Next, two representative methods for detecting the air-fuel ratio difference ΔAFR will be explained while referring to FIG. 26A.

The first method is the method of selecting the time period giving the reference air-fuel ratio AFRB in the air-fuel ratio AFR2 which is detected by the downstream side air-fuel ratio sensor 24 (FIG. 26A) and detecting the air-fuel ratio difference ΔAFR from the difference between the air-fuel ratio AFR1 detected by the upstream side air-fuel ratio sensor 23 and the reference air-fuel ratio AFRB of the AFR2 detected by the downstream side air-fuel ratio sensor 24 or the average value of these differences in this time period I.

Figure 26A:
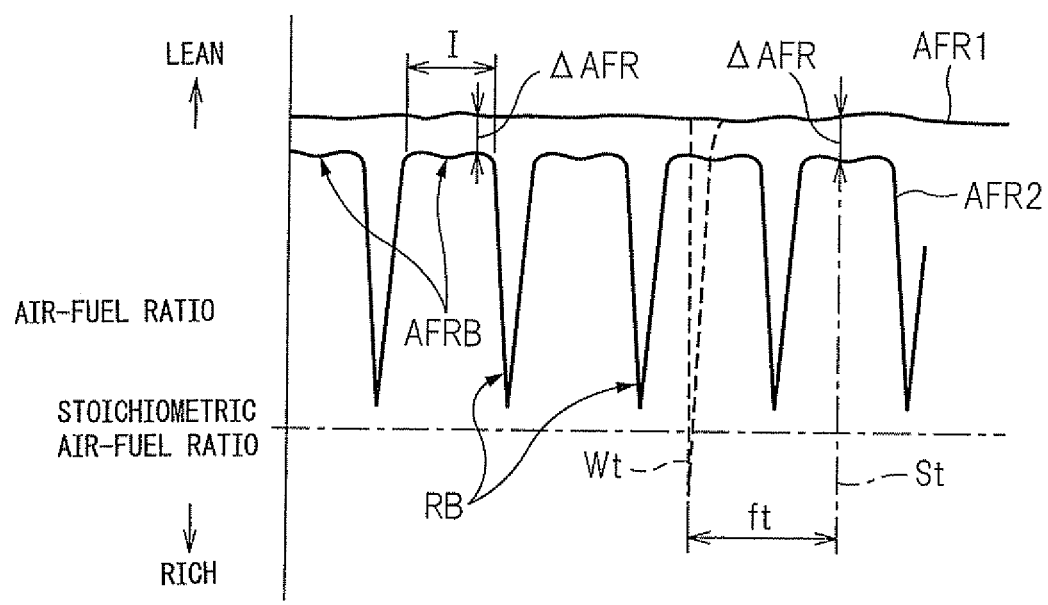
FIGS. 26A and 26B are views which show a change in the air-fuel ratio which is detected by the downstream side air-fuel ratio sensor, etc.
Figure 26B:
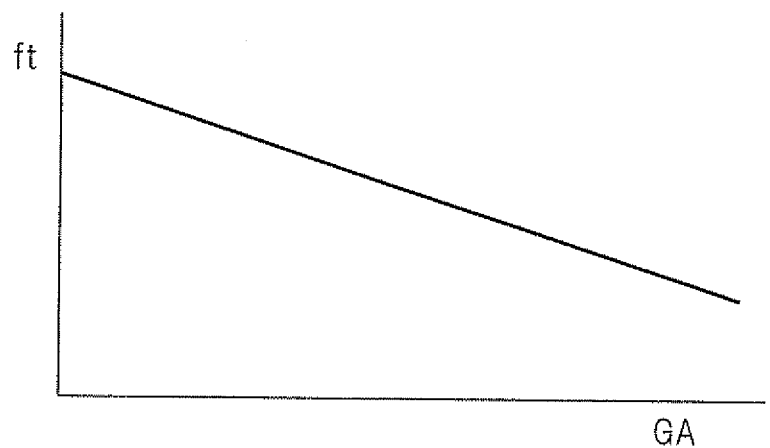

The second method is the method of detecting the air-fuel ratio difference ΔAFR from the air-fuel ratio AFR1 detected by the upstream side air-fuel ratio sensor 23 and the reference air-fuel ratio AFRB of the AFR2 detected by the downstream side air-fuel ratio sensor 24 at the timing St which is retarded by exactly the time period ft from the timing of injection of hydrocarbons from the hydrocarbon feed valve 15 which is shown by the broken line Wt in FIG. 26A. In this case, the faster the flow rate of the exhaust gas, that is, the greater the intake air amount, the shorter the time period ft where the air-fuel ratio difference ΔAFR can be detected. This time period ft is found in advance by experiments. The time period ft is stored in advance as a function of the intake air amount GA as shown in FIG. 26B.

Figure 27:
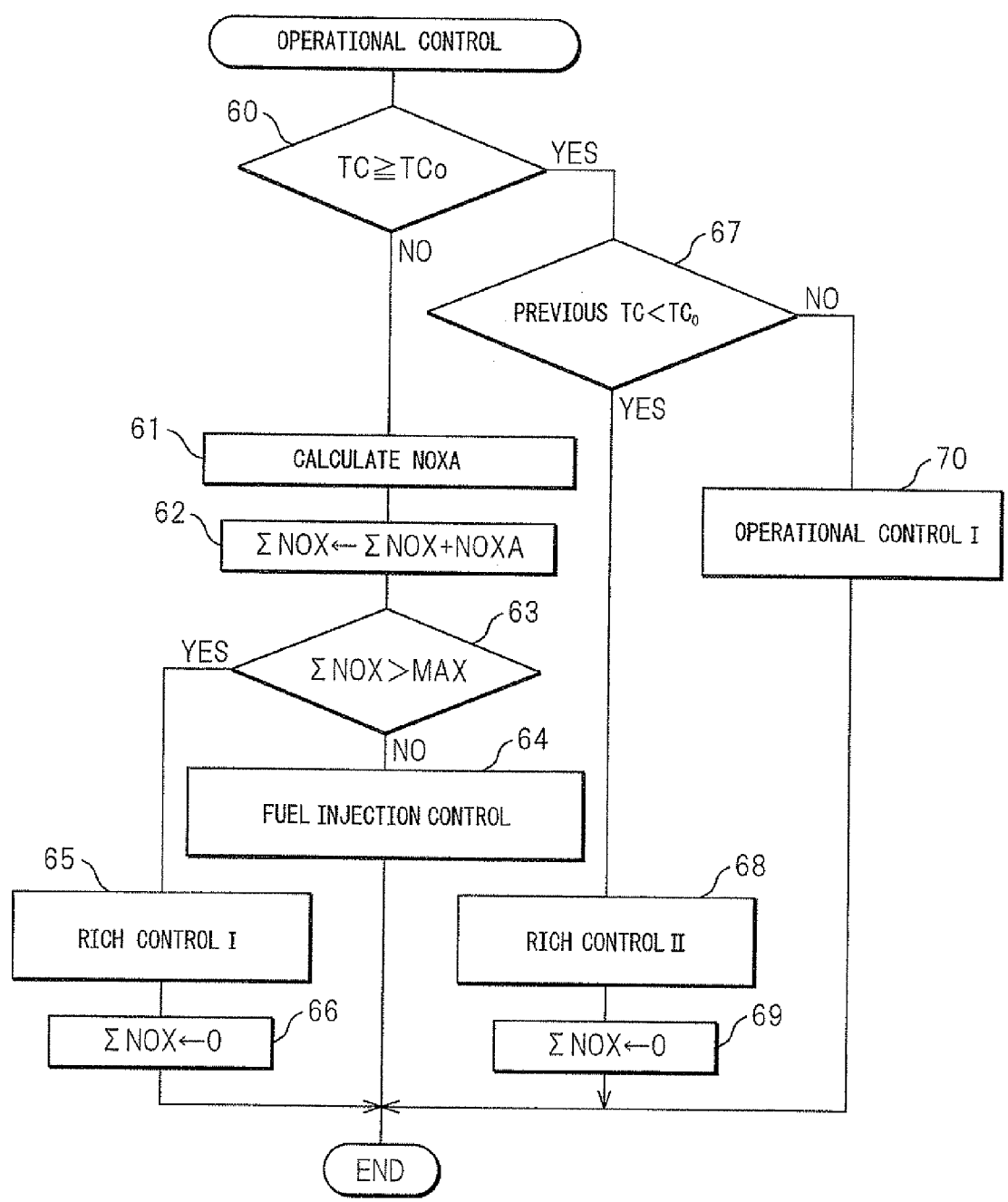
FIG. 27 is a flowchart for operational control.

FIG. 27 shows a routine for operational control of overall operation of an engine. Note that, this routine is executed by interruption every certain time interval.

Referring to FIG. 27, first, at step 60, it is judged from the output signal of the temperature sensor 25 if the temperature TC of the exhaust purification catalyst 13 exceeds the activation temperature TCo. When TC<TCo, that is, when the exhaust purification catalyst 13 is not activated, it is judged that the second $NO_x$ purification method should be used, then the routine proceeds to step 61. At step 61, the $NO_x$ amount NOXA which is exhausted per unit time is calculated from the map which is shown in FIG. 17. Next, at step 62, ΣNOx is increased by the exhausted $NO_x$ amount NOXA so as to calculate the stored $NO_x$ amount ΣNOx. Next, at step 63, it is judged if the stored $NO_x$ amount ΣNOx exceeds an allowable value MAX.

When it is judged at step 63 that ΣNOx≤MAX, the routine proceeds to step 64 where processing for injecting fuel from the fuel injector 3 is performed. At this time, fuel is injected from the fuel injector 3 so that a predetermined lean air-fuel ratio which is determined from the operating state of the engine is obtained. As opposed to this, when it is judged at step 63 that ΣNOx>MAX, the routine proceeds to step 65 where rich control I is performed. That is, the additional fuel amount WR is calculated from the map which is shown in FIG. 19 and an injection action of the additional fuel is performed. At this time, the stored $NO_x$ is released from the exhaust purification catalyst 13. Next, at step 66, ΣNOx is cleared.

On the other hand, when it is judged at step 60 that TC≥TCo, that is, when the exhaust purification catalyst 13 is activated, the routine proceeds to step 67 where it is judged if TC<TCo stood at the time of the previous interruption. When TC<TCo stood at the time of the previous interruption, that is, when the exhaust purification catalyst 13 is currently activated, the routine proceeds to step 68 where rich control II is performed. At this time as well, the additional fuel amount WR is calculated from the map which is shown in FIG. 19 and an injection action of the additional fuel is performed to make the exhaust purification catalyst 13 release the stored $NO_x$. Next, at step 69, ΣNOx is cleared.

As opposed to this, when TC≥TCo stood even at the time of the previous interruption, that is, when the exhaust purification catalyst 13 was already activated, the routine proceeds to step 70 where the $NO_x$ purification action by the first $NO_x$ purification control method according to the present invention is performed. That is, when the exhaust purification catalyst 13 is not activated, the $NO_x$ purification action is performed by the second $NO_x$ purification method, and when the exhaust purification catalyst 13 is activated, the second $NO_x$ purification method is switched to the first $NO_x$ purification method.

When the second $NO_x$ purification method is switched to the first $NO_x$ purification method, if the exhaust purification catalyst 13 stores $NO_x$, the exhaust purification catalyst 13 is made to release the stored $NO_x$ all at once without reduction. Therefore, in the example which is shown in FIG. 25, to prevent the exhaust purification catalyst 13 from being made to release the stored $NO_x$ all at once without reduction in this way, right before the second $NO_x$ purification method is switched to the first $NO_x$ purification method, at step 68, rich control II is performed for making the exhaust purification catalyst 13 release the stored $NO_x$ by the second $NO_x$ purification method.

Figure 28:
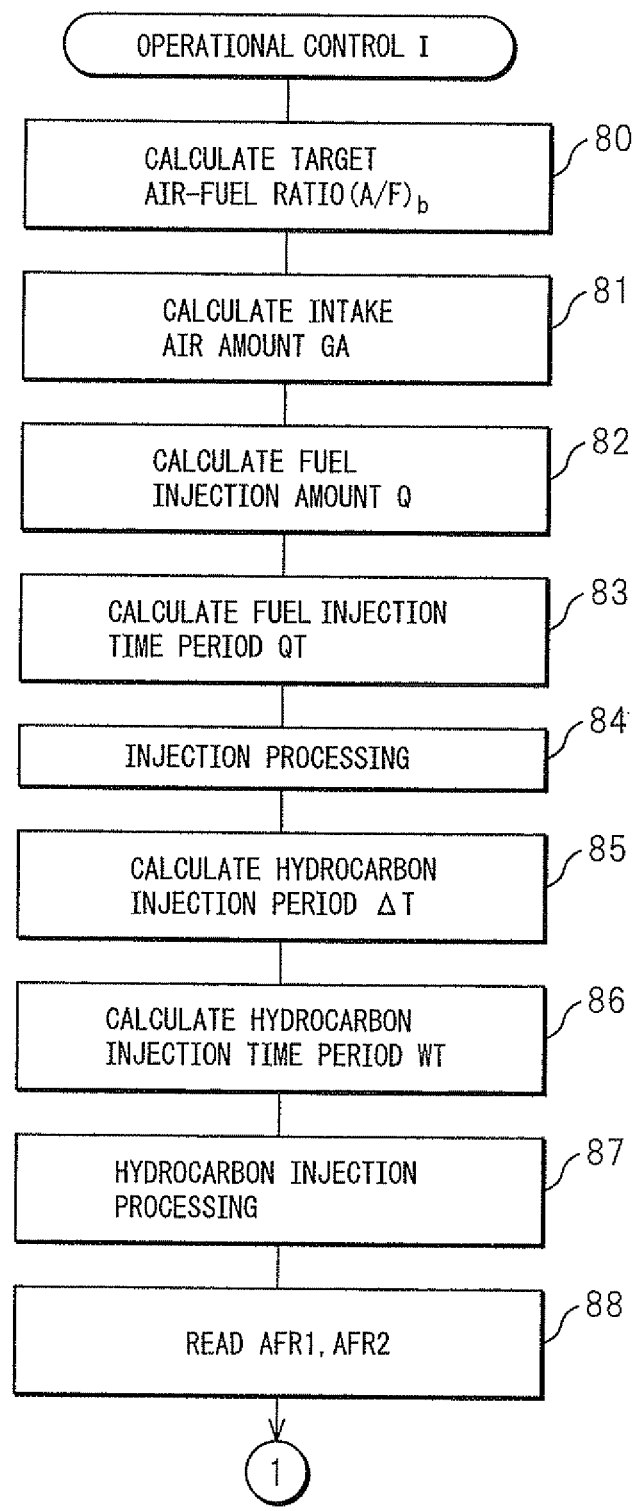
FIGS. 28 and 29 are flowcharts which show an embodiment of operational control I.
Figure 29:
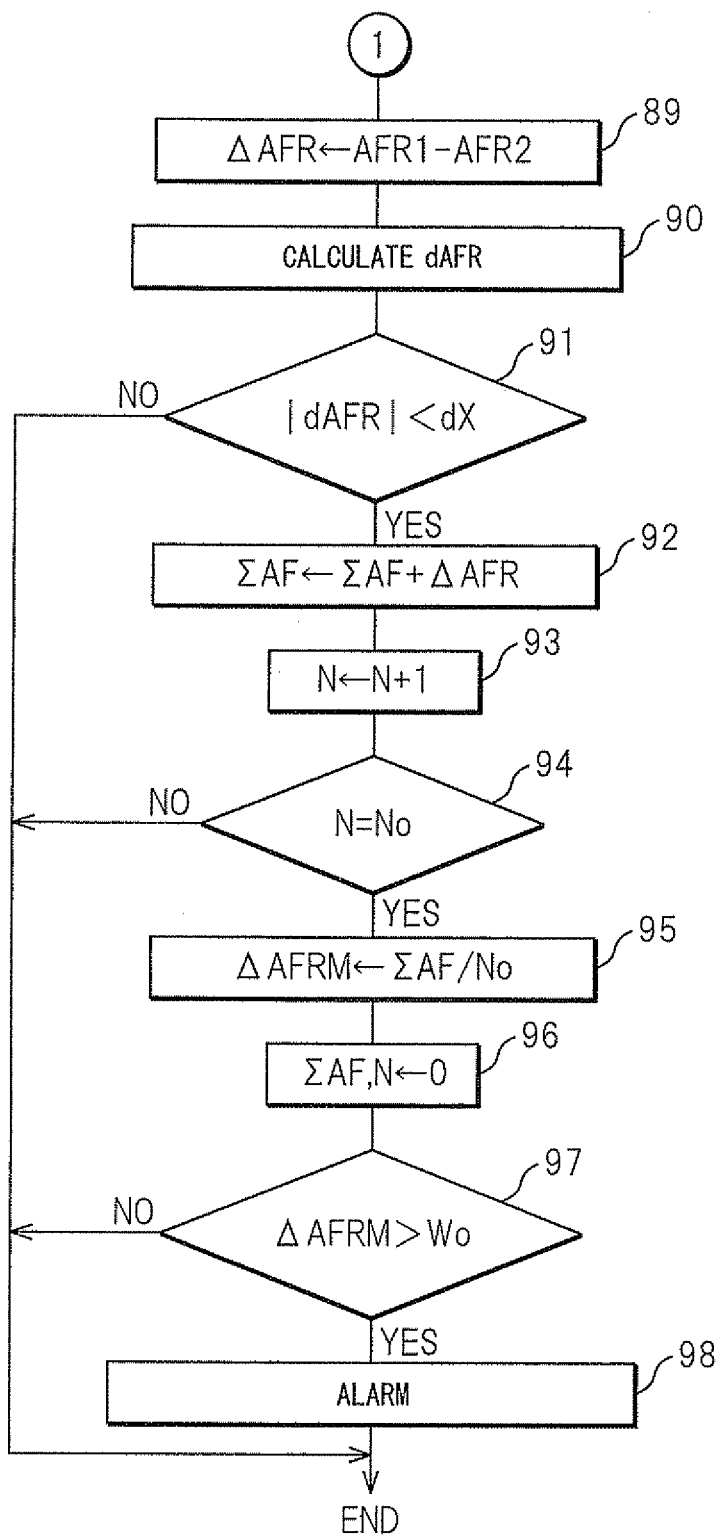

Next, the operational control I which is performed at step 70, that is, the $NO_x$ purification action by the first $NO_x$ purification method, will be explained. FIG. 28 and FIG. 29 show a first embodiment of this operational control I. Note that, in this first embodiment, the case of using the first method which was explained with reference to FIG. 26A to find the air-fuel ratio difference ΔAFR is shown.

Referring to FIG. 28, first, at step 80, the target value of the base air-fuel ratio, that is, the target air-fuel ratio (A/F)b, is calculated from the map which is shown in FIG. 20B. Next, at step 81, the intake air amount GA is calculated from the output signal of the intake air amount detector 8. Next, at step 82, the fuel injection amount Q for generation of output from the fuel injector 3 which is required for making the base air-fuel ratio the target air-fuel ratio (A/F)b is calculated from the target air-fuel ratio (A/F)b and the intake air amount GA. Next, at step 83, the fuel injection time period QT is calculated from this fuel injection amount Q, next, at step 84, fuel injection processing is performed for injecting fuel from the fuel injector 3 in accordance with this fuel injection time period QT.

Next, at step 85, the optimal hydrocarbon injection period ΔT is calculated from the map which is shown in FIG. 21B. Next, at step 86, the optimal hydrocarbon injection period WT is calculated from the map which is shown in FIG. 21C. Next, at step 87, hydrocarbon injection processing is performed for injecting hydrocarbons from the hydrocarbons feed valve 15 in accordance with this hydrocarbon injection period WT.

Next, at step 88, the air-fuel ratio AFR1 detected by the upstream side air-fuel ratio sensor 23 and the air-fuel ratio AFR2 detected by the downstream side air-fuel ratio sensor 24 are read. Next, at step 89, the air-fuel ratio AFR1 detected by the upstream side air-fuel ratio sensor 23 is reduced by the air-fuel ratio AFR2 detected by the downstream side air-fuel ratio sensor 24 to calculate the air-fuel ratio difference ΔAFR (=AFR1−AFR2). Next, at step 90, to judge if the air-fuel ratio AFR2 detected by the downstream side air-fuel ratio sensor 24 is the reference air-fuel ratio AFRB, the change dAFR of the air-fuel ratio difference ΔAFR between the time of the previous interruption and the time of the current interruption is calculated.

Next, at step 91, it is judged if the absolute value of the change dAFR of the air-fuel ratio difference ΔAFR is smaller than a predetermined small value dX. When the absolute value of the change dAFR of the air-fuel ratio difference ΔAFR is larger than dX, that is, when the air-fuel ratio AFR2 detected by the downstream side air-fuel ratio sensor 24 rapidly changes such as shown in FIG. 25A by RS, the processing cycle is ended. As opposed to this, when the absolute value of the change dAFR of the air-fuel ratio difference ΔAFR is smaller than dX, that is, when the change of the air-fuel ratio AFR2 detected by the downstream side air-fuel ratio sensor 24 is small, it is judged that the air-fuel ratio AFR2 detected by the downstream side air-fuel ratio sensor 24 is the reference air-fuel ratio AFRB and the routine proceeds to step 92.

At step 92, the air-fuel ratio difference ΔAFR is added to ΣAF to calculate the integrated value ΣAF of the air-fuel ratio difference ΔAFR. Next, at step 93, the count N is incremented by exactly 1. Next, at step 94, it is judged if the count N has reached a constant value No. When the count N reaches the constant value No, the routine proceeds to step 95 where the integrated value ΣAF is divided by the constant value No to calculate the average value ΔAFRM of the air-fuel ratio difference ΔAFR. Since the average value ΔAFRM of the air-fuel ratio difference ΔAFR is calculated in this way in this embodiment, in this embodiment, it becomes possible to calculate the amount WS of hydrocarbons which slip through the exhaust purification catalyst 13 from the average value ΔAFRM of the air-fuel ratio difference ΔAFR.

If the average value ΔAFRM of the air-fuel ratio difference ΔAFR is calculated, the routine proceeds to step 96 where ΣAF and N are cleared. Next, at step 97, it is judged if the average value ΔAFRM of the air-fuel ratio difference ΔAFR is larger than a predetermined limit value Wo. When the average value ΔAFRM of the air-fuel ratio difference ΔAFR is larger than the limit value Wo, the routine proceeds to step 98 where an alarm is issued which shows that the exhaust purification catalyst 13 has deteriorated or the hydrocarbon feed valve 15 is abnormal.

Next, a second embodiment of the operational control 1 which is performed at step 70 of FIG. 27 will be explained.

Now then, when the first $NO_x$ purification method according to the present invention is being used to perform an $NO_x$ purification action, when the air-fuel ratio of the exhaust gas which is exhausted from the engine has become the optimal base air-fuel ratio (A/F)b shown in FIG. 20B and the rich side peak air-fuel ratio (A/F)p of the air-fuel ratio detected by the downstream side air-fuel ratio sensor 24 becomes the target peak air-fuel ratio (A/F)t shown in FIG. 23, the maximum NOx purification rate is obtained. Therefore, in this second embodiment, a feedback control of the fuel injection amount from the fuel injector 3 is performed based on the output signal of the upstream side air-fuel ratio sensor 23 so that the air-fuel ratio of the exhaust gas which is exhausted from the engine becomes the optimal base air-fuel ratio (A/F)b, and a feedback control of the feed amount of hydrocarbons from the hydrocarbon feed valve 15 is performed based on the output signal of the downstream side air-fuel ratio sensor 24 so that the rich side peak air-fuel ratio (A/F)p of the air-fuel ratio detected by the downstream side air-fuel ratio sensor 24 becomes the target peak air-fuel ratio (A/F)t.

Specifically speaking, the fuel injection amount QT calculated from the optimal base air-fuel ratio (A/F)b and the intake air amount GA is multiplied with a correction coefficient G to calculate the final fuel injection amount QTO (=G·QT) from the fuel injector 3. The air-fuel ratio of the exhaust gas which is exhausted from the engine is made to become the optimal base air-fuel ratio (A/F)b by feedback control of value of the correction coefficient G. That is, the value of the correction coefficient G which is required for making the air-fuel ratio of the exhaust gas exhausted from the engine the optimal base air-fuel ratio (A/F)b is learned.

Further, the optimal hydrocarbon injection period WT calculated from the map of FIG. 21C is multiplied with a correction coefficient K to calculate the final injection time period WTO (=K·WT) of hydrocarbons from the hydrocarbon feed valve 15 and the rich side peak air-fuel ratio (A/F)p of the air-fuel ratio detected by the downstream side air-fuel ratio sensor 24 is made to become the target peak air-fuel ratio (A/F)t by feedback control of the value of the correction coefficient K. That is, the value of the correction coefficient K which is required for making the rich side peak air-fuel ratio (A/F)p of the air-fuel ratio detected by the downstream side air-fuel ratio sensor 24 the target peak air-fuel ratio (A/F)t is learned.

In this regard, when the $NO_x$ purification action by the first $NO_x$ purification method is being performed, if the reference air-fuel ratio AFRB of the AFR2 detected by the downstream side air-fuel ratio sensor 24 deviates to the rich side from the air-fuel ratio AFR1 detected by the upstream side air-fuel ratio sensor 23, the rich side peak air-fuel ratio (A/F)p of the air-fuel ratio detected by the downstream side air-fuel ratio sensor 24 also deviates to the rich side. Therefore, at this time, if making the rich side peak air-fuel ratio (A/F)p of the air-fuel ratio detected by the downstream side air-fuel ratio sensor 24 the target peak air-fuel ratio (A/F)t by feedback control, the amount of injection of hydrocarbons from the hydrocarbon feed valve 15 will end up deviating from the optimal amount and as a result the $NO_x$ purification rate will end up falling.

In this case, to prevent the NOx purification rate from falling, when the reference air-fuel ratio AFRB of the AFR2 detected by the downstream side air-fuel ratio sensor 24 deviates to the rich side, that is, when the air-fuel ratio difference ΔAFR between the air-fuel ratio AFR1 detected by the upstream side air-fuel ratio sensor 23 and the reference air-fuel ratio AFRB of the AFR2 detected by the downstream side air-fuel ratio sensor 24 exceeds a predetermined allowable value AX, for example, 0.3, it is necessary to prohibit feedback control by the downstream side air-fuel ratio sensor 24.

Therefore, in the embodiment according to the present invention, at the time of engine operation, the injection period of hydrocarbons from the hydrocarbon feed valve 15 is controlled so that the concentration of hydrocarbons which flows into the exhaust purification catalyst 13 vibrates by within a predetermined range of period and the amount of injection of hydrocarbons from the hydrocarbon feed valve 15 is controlled so that the amplitude of the change in concentration of hydrocarbons which flows into the exhaust purification catalyst 13 becomes within a predetermined range of amplitude, when the air-fuel ratio difference ΔAFR is smaller than a predetermined allowable value AX, the amount of injection of hydrocarbons from the hydrocarbon feed valve 15 is controlled based on the output signal of the downstream side air-fuel ratio sensor 24 so that the amplitude of the change in concentration of hydrocarbons which flows into the exhaust purification catalyst 13 becomes within the predetermined range of amplitude, and when the air-fuel ratio difference ΔAFR is larger than the predetermined allowable value AX, control of the amount of injection of hydrocarbons from the hydrocarbon feed valve 15 based on the output signal of the downstream side air-fuel ratio sensor 24 is prohibited.

Note that, in this case, as explained earlier, when the air-fuel ratio difference ΔAFR is smaller than the predetermined allowable value AX, the value of the correction coefficient K which is required for making the rich side peak air-fuel ratio (A/F)p detected by the downstream side air-fuel ratio sensor 24 the prestored target air-fuel ratio (A/F)t, that is, the correction value, is learned for the amount of injection of hydrocarbons from the hydrocarbon feed valve 15. In this case, even if the air-fuel ratio difference ΔAFR becomes larger than the predetermined allowable value AX and control of the amount of injection of hydrocarbons from the hydrocarbon feed valve 15 based on the output signal of the downstream side air-fuel ratio sensor 24 is prohibited, at the time of calculating the amount of injection of hydrocarbons from the hydrocarbon feed valve 15, the value of this correction coefficient K, that is, the correction value, is used. Therefore, when control of the amount of injection of hydrocarbons from the hydrocarbon feed valve 15 based on the output signal of the downstream side air-fuel ratio sensor 24 is prohibited, the amount of injection of hydrocarbons from the hydrocarbon feed valve 15 is corrected using the value of this correction coefficient K, that is, the learned correction value.

On the other hand, if the time period during which control of the amount of injection of hydrocarbons based on the output signal of the downstream side air-fuel ratio sensor 24 is prohibited becomes longer, it becomes necessary to relearn the value of the correction coefficient K. Next, the method of relearning the value of this correction coefficient K will be explained.

Figure 30A:
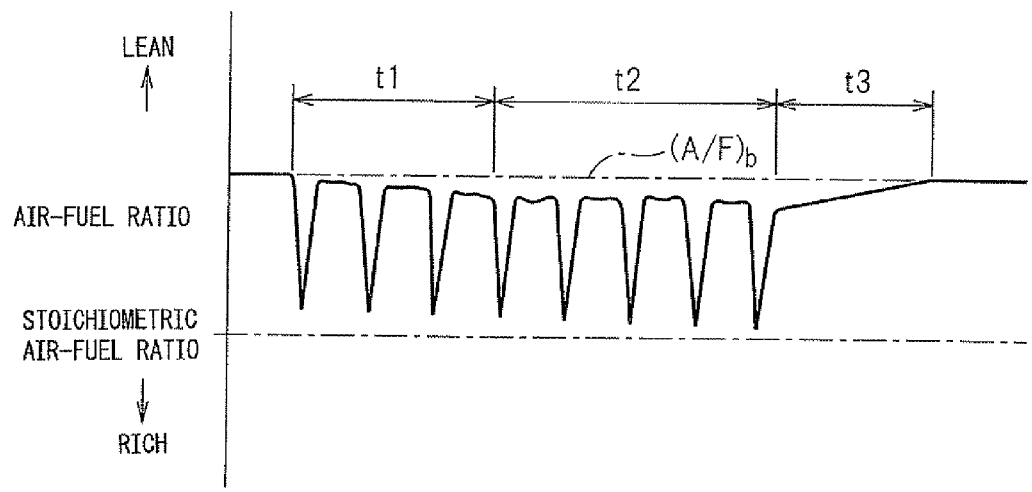
FIGS. 30A and 30B are views which show a change in the air-fuel ratio which is detected by the downstream side air-fuel ratio sensor, etc.

FIG. 30A shows the change of the air-fuel ratio which is detected by the downstream side air-fuel ratio sensor 24 when the $NO_x$ purification action by the first $NO_x$ purification method is started and when the $NO_x$ purification action by the first $NO_x$ purification method is stopped. As shown in FIG. 30A by t1, when the $NO_x$ purification action by the first $NO_x$ purification method is started, the reference air-fuel ratio AFRB of the air-fuel ratio AFR2 which is detected by the downstream side air-fuel ratio sensor 24 deviates from the base air-fuel ratio (A/F)b and gradually becomes the rich side. As shown in FIG. 30A by t2, when the $NO_x$ purification action by the first $NO_x$ purification method continues, the reference air-fuel ratio AFRB continues to deviate from the base air-fuel ratio (A/F)b to the rich side. On the other hand, if the $NO_x$ purification action by the first $NO_x$ purification method is stopped, as shown in FIG. 30A by t3, the reference air-fuel ratio AFRB gradually becomes larger toward the base air-fuel ratio (A/F)b and finally becomes the base air-fuel ratio (A/F)b.

Now then, to suitably relearn the value of the correction coefficient K, it is necessary to make the air-fuel ratio difference ΔAFR between the air-fuel ratio AFR1 detected by the upstream side air-fuel ratio sensor 23 and the reference air-fuel ratio AFRB of the AFR2 detected by the downstream side air-fuel ratio sensor 24 smaller than the allowable value AX. Therefore, in the embodiment according to the present invention, when control of the amount of injection of hydrocarbons from the hydrocarbon feed valve 15 based on the output signal of the downstream side air-fuel ratio sensor 24 is prohibited and when it is judged that the value of the correction coefficient K, that is, the correction value, should be relearned, the action of injection of hydrocarbons from the hydrocarbon feed valve 15 is controlled so that the air-fuel ratio difference ΔAFR becomes smaller than the predetermined allowable value AX and thereby the value of the correction coefficient K, that is, the correction value, is relearned.

Note that, as will be understood from FIG. 30A, if stopping the $NO_x$ purification action by the first $NO_x$ purification method for the t3 time period, the reference air-fuel ratio AFRB of the AFR2 detected by the downstream side air-fuel ratio sensor 24 becomes the base air-fuel ratio (A/F)b, therefore the air-fuel ratio difference ΔAFR between the air-fuel ratio AFR1 detected by the upstream side air-fuel ratio sensor 23 and the reference air-fuel ratio AFRB of the AFR2 detected by the downstream side air-fuel ratio sensor 24 becomes smaller than the allowable value AX. Therefore, in one embodiment according to the present invention, when the value of the correction coefficient K should be relearned, the $NO_x$ purification action by the first $NO_x$ purification method is stopped for the t3 time period.

Figure 30B:
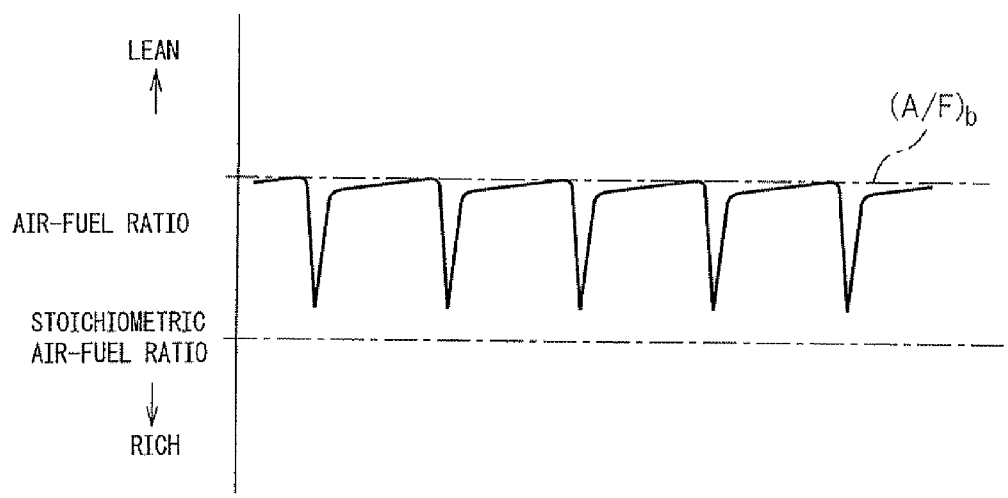

Further, as shown in FIG. 30B, when the value of the correction coefficient K should be relearned, even if making the injection period of hydrocarbons from the hydrocarbon feed valve 15 longer, the air-fuel ratio difference ΔAFR between the air-fuel ratio AFR1 detected by the upstream side air-fuel ratio sensor 23 and the reference air-fuel ratio AFRB of the AFR2 detected by the downstream side air-fuel ratio sensor 24 becomes smaller than the allowable value AX. Therefore, in this embodiment according to the present invention, when the value of the correction coefficient K, that is, the correction value, should be relearned, as shown in FIG. 30B, the time interval of injections of hydrocarbons from the hydrocarbon feed valve 15 is temporarily made longer or, as shown in FIG. 30A by t3, the action of injection of hydrocarbons from the hydrocarbon feed valve 15 is temporarily stopped.

Figure 31:
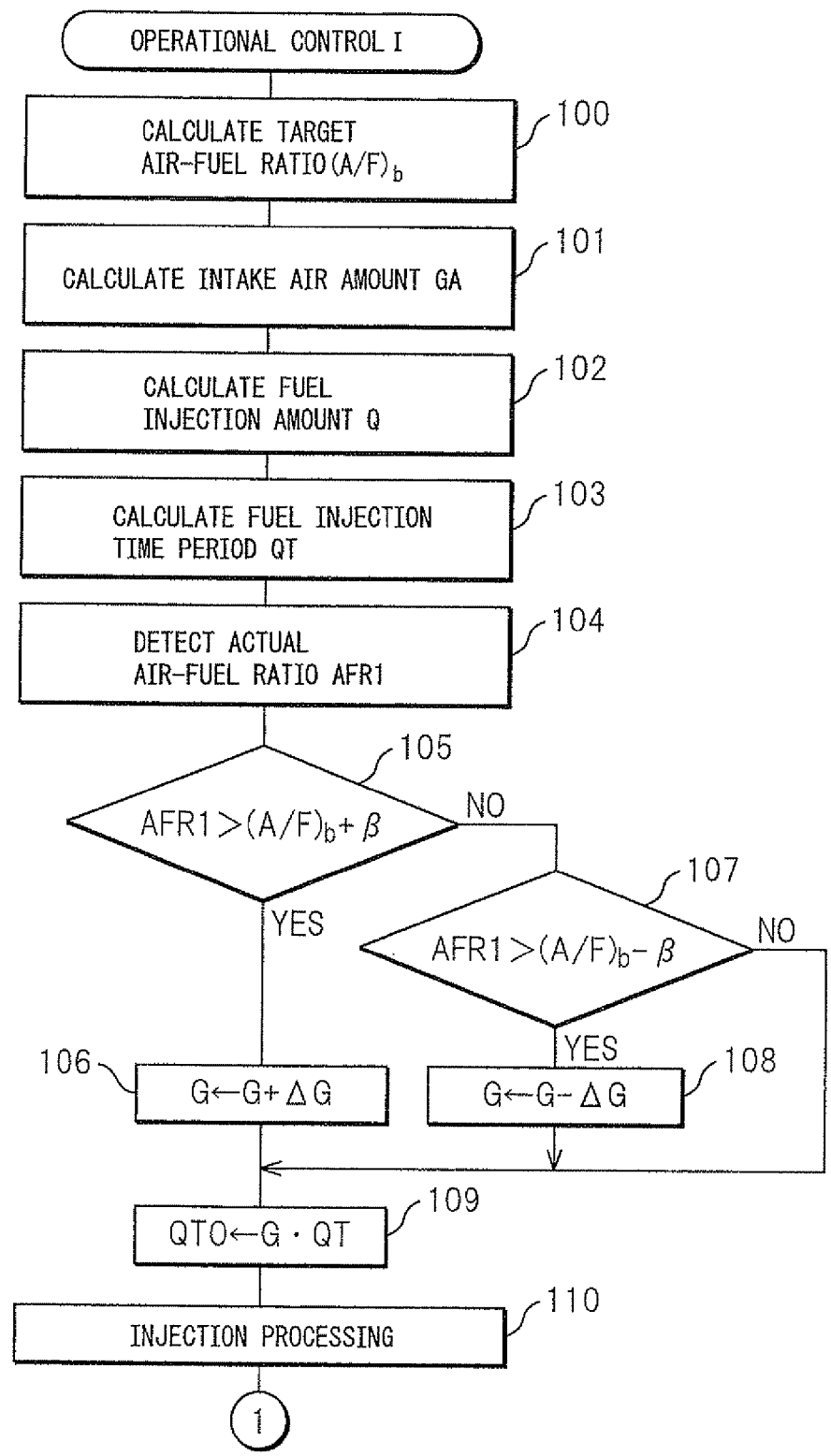
FIGS. 31 and 32 are flowcharts which show another embodiment of operational control I.
Figure 32:
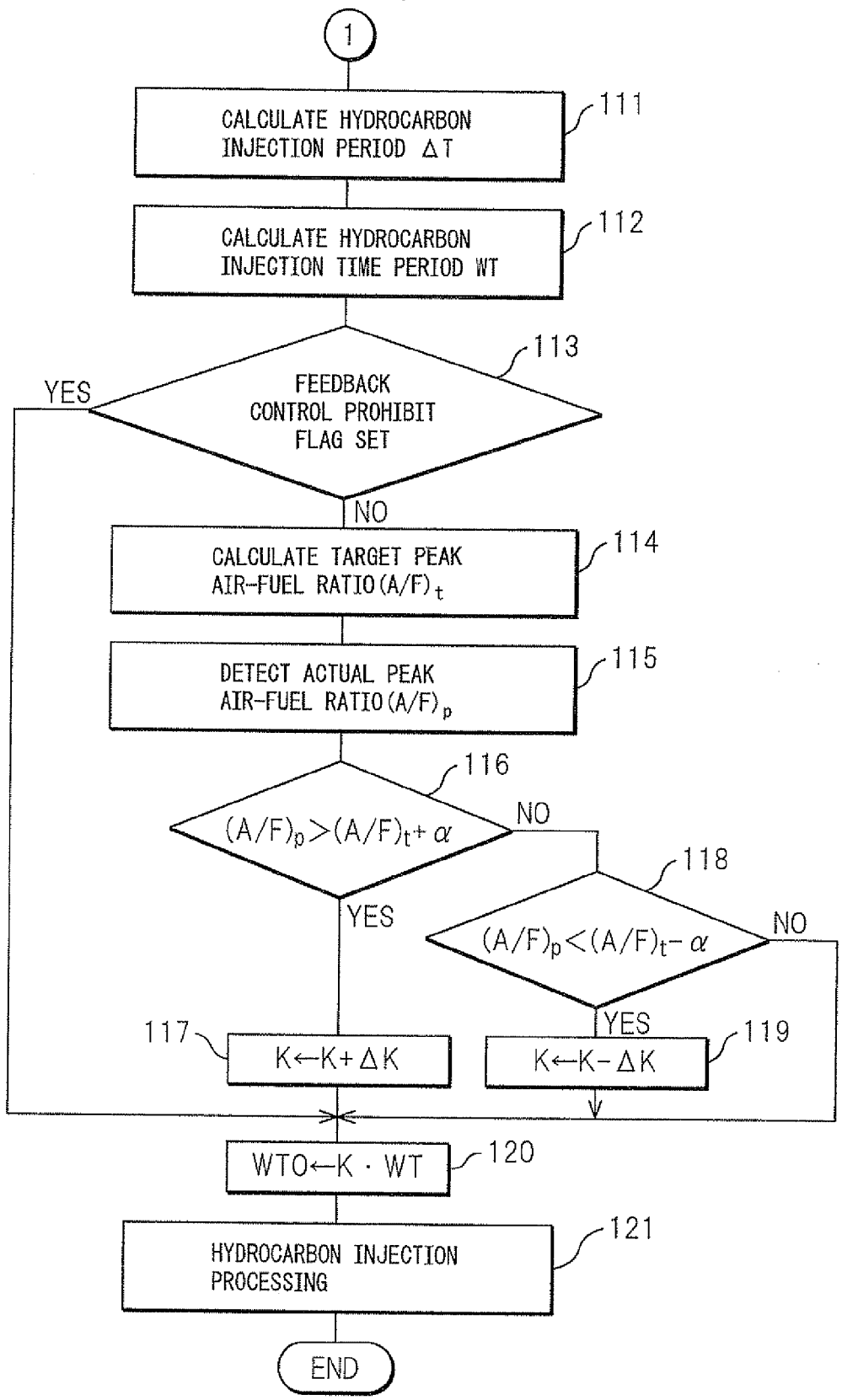

FIG. 31 and FIG. 32 show the routine for execution of a second embodiment of the operational control I. Note that, in this second embodiment, the case is shown where the second method which was explained with reference to FIG. 26B is used to find the air-fuel ratio difference ΔAFR and, when the value of the correction coefficient K should be relearned, the $NO_x$ purification action by the first $NO_x$ purification method is temporarily stopped.

Referring to FIG. 31, first, at step 100, the target value of the base air-fuel ratio, that is, the target air-fuel ratio (A/F)b, is calculated from the map which is shown in FIG. 20B. Next, at step 101, the intake air amount GA is calculated from the output signal of the intake air amount detector 8. Next, at step 102, the fuel injection amount Q for generation of output from the fuel injector 3 which is required for making the base air-fuel ratio the target air-fuel ratio (A/F)b is calculated from the target air-fuel ratio (A/F)b and the intake air amount GA. Next, at step 103, the fuel injection time period QT is calculated from this fuel injection amount Q.

Next, at step 104, the output of the upstream side air-fuel ratio sensor 23 is used as the basis to detect the actual air-fuel ratio AFR1 of the exhaust gas which is exhausted from the engine. Next, at step 105, it is judged if the actual air-fuel ratio AFR1 is larger than the target air-fuel ratio (A/F)b plus a small constant value β. When AFR1>(A/F)b+β, the routine proceeds to step 106 where the correction coefficient G for the fuel injection time period QT is increased by a constant value ΔG. Next, the routine proceeds to step 106 where the fuel injection time period QT multiplied with the correction coefficient G (G·QT) is made the final fuel injection time period QTO.

On the other hand, when it is judged at step 105 that AFR1>(A/F)b+β does not stand, the routine proceeds to step 107 where it is judged if the actual air-fuel ratio AFR1 of the exhaust gas which is exhausted from the engine is smaller than the target peak air-fuel ratio (A/F)b minus a constant value β. When AFR1<(A/F)b−β, the routine proceeds to step 108 where the correction coefficient G is decreased by the constant value ΔG, then the routine proceeds to step 109. Next, at step 110, fuel injection processing is performed to inject fuel from the fuel injector 3 in accordance with the fuel injection time period QTO.

In this way, in this embodiment, when AFR1>(A/F)b+β, the fuel injection time is increased, while when AFR1(A/F)b−β, the fuel injection time period is decreased, so the actual air-fuel ratio of the exhaust gas which is exhausted from the engine, that is, the actual base air-fuel ratio AFR1, is made to mach the target base air-fuel ratio (A/F)b.

Next, at step 111, the optimal hydrocarbon injection period ΔT is calculated from the map which is shown in FIG. 21B. Next, at step 112, the optimal hydrocarbon injection period WT is calculated from the map which is shown in FIG. 21C. Next, at step 113, it is judged if the feedback control prohibit flag is set. This feedback control prohibit flag is reset when the air-fuel ratio difference ΔAFR between the air-fuel ratio AFR1 detected by the upstream side air-fuel ratio sensor 23 and the reference air-fuel ratio AFRB of the AFR2 detected by the downstream side air-fuel ratio sensor 24 is smaller than the allowable value AX.

When the feedback control prohibit flag is reset, that is, when the air-fuel ratio difference ΔAFR is smaller than the allowable value AX, the routine proceeds to step 114 where the target peak air-fuel ratio (A/F)t is calculated from the map which is shown in FIG. 23. Next, at step 115, the actual rich side peak air-fuel ratio (A/F)p is detected from the output of the downstream side air-fuel ratio sensor 24.

Next, at step 116, it is judged if the actual rich side peak air-fuel ratio (A/F)p is larger than the value of the target peak air-fuel ratio (A/F)t plus a small constant value α. When (A/F)p>(A/F)t+α, the routine proceeds to step 117 where the correction coefficient K for the hydrocarbon injection period WT is increased by a constant value ΔK. Next, the routine proceeds to step 120 where the hydrocarbon injection period WT multiplied with the correction coefficient K (K·WT) is made the final hydrocarbon injection period WTO.

On the other hand, when it is judged at step 116 that (A/F)p>(A/F)t+α does not stand, the routine proceeds to step 118 where it is judged if the actual rich side peak air-fuel ratio (A/F)p is smaller than the target peak air-fuel ratio (A/F)t minus the constant value α. When (A/F)p<(A/F)t−α, the routine proceeds to step 119 where the correction coefficient K is decreased by the constant value ΔK, then the routine proceeds to step 120. Next, at step 121, hydrocarbon injection processing is performed to inject hydrocarbons from the hydrocarbon feed valve 15 in accordance with the final hydrocarbon injection period WTO.

In this way, when (A/F)p>(A/F)t+α, the hydrocarbon injection period is increased, while when (A/F)p<(A/F)t−α, the hydrocarbon injection period is decreased, so the actual rich side peak air-fuel ratio (A/F)p is made to match with the target peak air-fuel ratio (A/F)t.

On the other hand, when it was judged at step 113 that the feedback control prohibit flag is set, the routine jumps to step 120 where the final hydrocarbon injection period WTO (=K·WT) is calculated. At this time, feedback control of the amount of injection of hydrocarbons from the hydrocarbon feed valve 15 based on the output signal of the downstream side air-fuel ratio sensor 24 is prohibited and the learned value of the correction coefficient K is used to calculate the final hydrocarbon injection period WTO.

Figure 33:
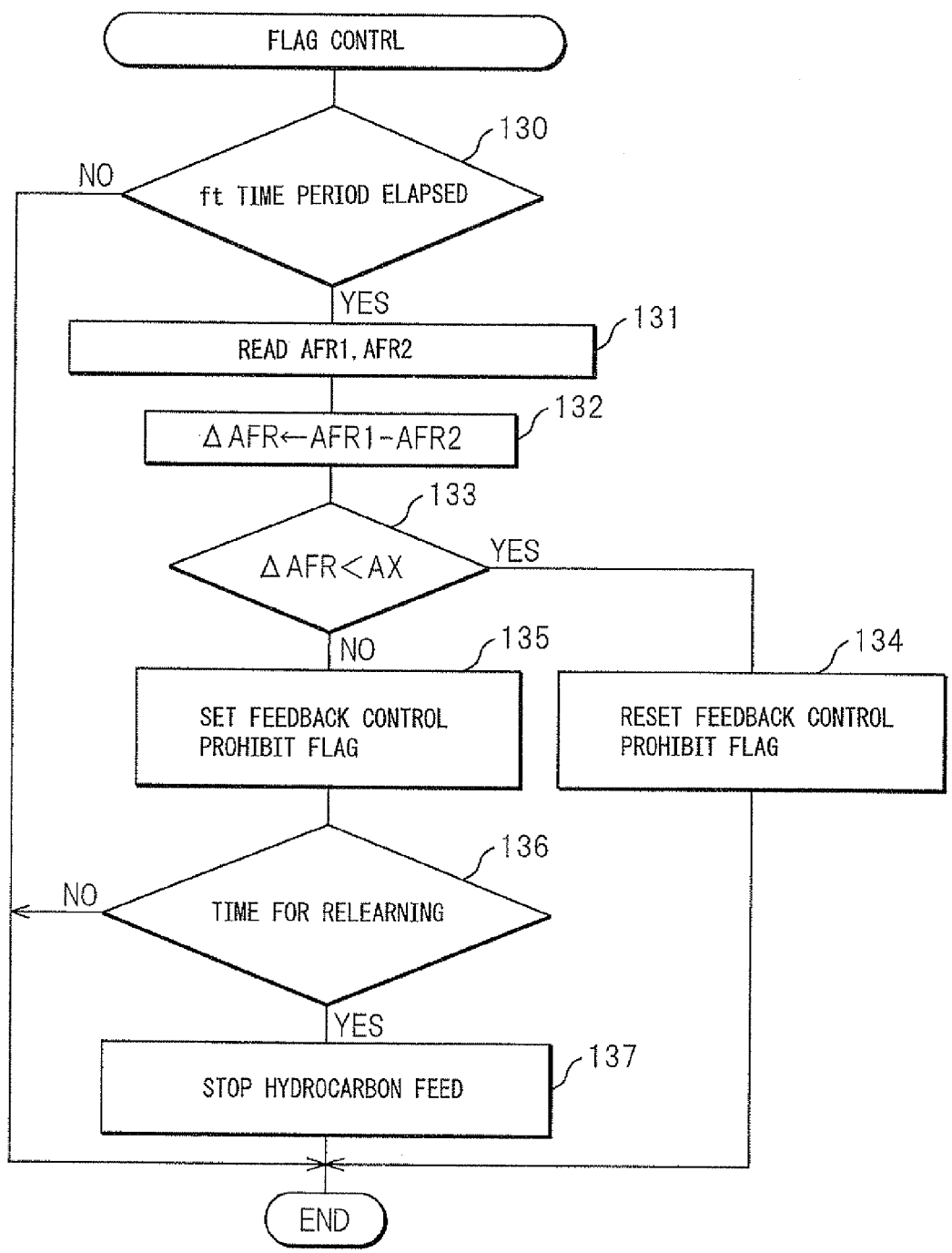
FIG. 33 is a flowchart for execution of flag control.

FIG. 33 shows the routine for control of the feedback control prohibit flag. This routine is executed by interruption every certain time interval.

Referring to FIG. 33, first, at step 130, it is judged if the time period ft has elapsed from when the action of injection of hydrocarbons from the hydrocarbon feed valve 15 was performed. Note that, this time period ft is found from the relationship which is shown in FIG. 26B. When the time period ft has not elapsed from when the action of injection of hydrocarbons from the hydrocarbon feed valve 15 was performed, the processing cycle is ended. As opposed to this, when the time period ft has elapsed from when the action of injection of hydrocarbons from the hydrocarbon feed valve 15 was performed, the routine proceeds to step 131 where the air-fuel ratio AFR1 detected by the upstream side air-fuel ratio sensor 23 and the air-fuel ratio AFR2 detected by the downstream side air-fuel ratio sensor 24 are read. Next, at step 132, the air-fuel ratio AFR1 detected by the upstream side air-fuel ratio sensor 23 is reduced by the air-fuel ratio AFR2 detected by the downstream side air-fuel ratio sensor 24 to calculate the air-fuel ratio difference ΔAFR(=AFR1−AFR2). Note that the air-fuel ratio AFR2 which is detected by the downstream side air-fuel ratio sensor 24 at this time expresses the reference air-fuel ratio AFRB.

Next, at step 133, it is judged if the air-fuel ratio difference ΔAFR between the air-fuel ratio AFR1 detected by the upstream side air-fuel ratio sensor 23 and the reference air-fuel ratio AFRB of the AFR2 detected by the downstream side air-fuel ratio sensor 24 is smaller than the allowable value AX. When the air-fuel ratio difference ΔAFR is smaller than the allowable value AX, the routine proceeds to step 134 where the feedback control prohibit flag is reset, then the processing cycle is ended. Therefore, at this time, the air-fuel ratio AFR2 detected by the downstream side air-fuel ratio sensor 24 is used as the basis for feedback control of the amount of injection of hydrocarbons from the hydrocarbon feed valve 15.

As opposed to this, when it is judged at step 133 that the air-fuel ratio difference ΔAFR is larger than the allowable value AX, the routine proceeds to step 135 where the feedback control prohibit flag is set. Therefore, at this time, feedback control of the amount of injection of hydrocarbons from the hydrocarbon feed valve 15 by the downstream side air-fuel ratio sensor 24 is stopped. Next, the routine proceeds to step 136 where it is judged if it is time to relearn the value of the correction coefficient K. For example, when a certain time period has elapsed from when the feedback control was prohibited and the operating state is suitable for learning the value of the correction coefficient K, or when the vehicle has been driven by a certain distance or more from when feedback control was prohibited and the operating state is suitable for learning the value of the correction coefficient K, it is judged that it is time to relearn the value of the correction coefficient K.

When it is judged at step 136 that it is not time to relearn the value of the correction coefficient K, the processing cycle is ended. As opposed to this, when it is judged at step 136 that it is time to relearn the value of the correction coefficient K, the routine proceeds to step 137 where the feed of hydrocarbons from the hydrocarbon feed valve 15 is stopped for the time period which is shown by t3 in FIG. 30A. If the feed of hydrocarbons from the hydrocarbon feed valve 15 is stopped in this way, the air-fuel ratio difference ΔAFR between the air-fuel ratio AFR1 detected by the upstream side air-fuel ratio sensor 23 and the reference air-fuel ratio AFRB of the AFR2 detected by the downstream side air-fuel ratio sensor 24 becomes smaller than the allowable value AX, and the feedback control prohibit flag is reset. As a result, the value of the correction coefficient K is relearned. Note that, when relearning the value of the correction coefficient K, as explained earlier, it is also possible to temporarily lengthen the injection period of hydrocarbons from the hydrocarbon feed valve 15 as shown in FIG. 30B.

Note that, as another embodiment, it is also possible to arrange an oxidation catalyst for reforming the hydrocarbons inside the engine exhaust passage upstream of the exhaust purification catalyst 13.

REFERENCE SIGNS LIST

4 . . . intake manifold
5 . . . exhaust manifold
7 . . . exhaust turbocharger
12a, 12b . . . exhaust pipe
13 . . . exhaust purification catalyst
14 . . . particulate filter 15 . . . hydrocarbon feed valve
23 . . . upstream side air-fuel ratio sensor
24 . . . downstream side air-fuel ratio sensor

The invention claimed is:

1. An exhaust purification system of an internal combustion engine wherein a hydrocarbon feed valve for feeding hydrocarbons is arranged in an engine exhaust passage, an upstream side air-fuel ratio sensor for detecting an air-fuel ratio of exhaust gas is arranged in the engine exhaust passage upstream of the hydrocarbon feed valve, an exhaust purification catalyst for reacting $NO_x$ contained in exhaust gas and reformed hydrocarbons is arranged in the engine exhaust passage downstream of the hydrocarbon feed valve, a downstream side air-fuel ratio sensor for detecting the air-fuel ratio of the exhaust gas is arranged in the engine exhaust passage downstream of the exhaust purification catalyst, the downstream side air-fuel ratio sensor is a type of sensor which has a solid electrolyte, electrodes respectively covering two side surfaces of the solid electrolyte, and a diffusion resistance layer covering one of electrodes and in which exhaust gas is guided onto the diffusion resistance layer, precious metal catalysts are carried on an exhaust gas flow surface of the exhaust purification catalyst and a basic exhaust gas flow surface part is formed around the precious metal catalysts, the exhaust purification catalyst has a property of reducing the $NO_x$ which is contained in exhaust gas if a concentration of hydrocarbons which flow into the exhaust purification catalyst is made to vibrate by within a predetermined range of amplitude and within a predetermined range of period and has a property of being increased in storage amount of $NO_x$ which is contained in exhaust gas if the vibration period of the hydrocarbon concentration is made longer than the predetermined range, when hydrocarbons are fed from the hydrocarbon feed valve, an air-fuel ratio detected by the downstream side air-fuel ratio sensor changes to a rich side from a reference air-fuel ratio which is detected when hydrocarbons are not fed from the hydrocarbon feed valve, and an amount of hydrocarbons which are fed from the hydrocarbon feed valve and which slip through the exhaust purification catalyst is detected from an air-fuel ratio difference between an air-fuel ratio which is detected by the upstream side air-fuel ratio sensor and the reference air-fuel ratio which is detected by the downstream side air-fuel ratio sensor.

2. An exhaust purification system of an internal combustion engine as claimed in claim 1 wherein the amount of hydrocarbons which are fed from the hydrocarbon feed valve and which slip through the exhaust purification catalyst becomes larger the larger said air-fuel ratio difference.

3. An exhaust purification system of an internal combustion engine as claimed in claim 2 wherein, at the time of engine operation, injection period of hydrocarbons from the hydrocarbon feed valve is controlled so that the concentration of hydrocarbons which flow into the exhaust purification catalyst vibrates by within said predetermined range of period and an amount of injection of hydrocarbons from the hydrocarbon feed valve is controlled so that the amplitude of the change in concentration of hydrocarbons which flow into the exhaust purification catalyst becomes within said predetermined range of amplitude, when said air-fuel ratio difference is smaller than a predetermined allowable value, the amount of injection of hydrocarbons from the hydrocarbon feed valve, an output signal of the downstream side air-fuel ratio sensor is controlled based on so that the amplitude of the change in concentration of hydrocarbons which flow into the exhaust purification catalyst becomes within the predetermined range of amplitude and, when said air-fuel ratio difference is larger than the predetermined allowable value, control of the amount of injection of hydrocarbons from the hydrocarbon feed valve based on the output signal of the downstream side air-fuel ratio sensor is prohibited.

4. An exhaust purification system of an internal combustion engine as claimed in claim 3, wherein when said air-fuel ratio difference is smaller than a predetermined allowable value, a correction value required for making a rich side peak air-fuel ratio detected by the downstream side air-fuel ratio sensor a prestored target air-fuel ratio is learned for the amount of injection of hydrocarbons from the hydrocarbon feed valve and, when said air-fuel ratio difference becomes larger than the predetermined allowable value and control of the amount of injection of hydrocarbons from the hydrocarbon feed valve based on the output signal of the downstream side air-fuel ratio sensor is prohibited, the amount of injection of hydrocarbons from the hydrocarbon feed valve is corrected using the learned correction value.

5. An exhaust purification system of an internal combustion engine as claimed in claim 4 wherein when control of the amount of injection of hydrocarbons from the hydrocarbon feed valve based on the output signal of the downstream side air-fuel ratio sensor is prohibited, if it is judged that said correction value should be relearned, an injection action of hydrocarbons from the hydrocarbon feed valve is controlled so that said air-fuel ratio difference becomes smaller than the predetermined allowable value and thereby said correction value is relearned.

6. An exhaust purification system of an internal combustion engine as claimed in claim 5 wherein when said correction value should be relearned, an injection interval of hydrocarbons from the hydrocarbon feed valve is temporarily made longer or the action of injection of hydrocarbons from the hydrocarbon feed valve is temporarily stopped.

7. An exhaust purification system of an internal combustion engine as claimed in claim 3, wherein an amount of fuel which is fed to an engine combustion chamber is controlled based on the output signal of said upstream side air-fuel ratio sensor so that an air-fuel ratio of the exhaust gas which is exhausted from the engine becomes a predetermined air-fuel ratio.

8. An exhaust purification system of an internal combustion engine as claimed in claim 3, wherein in said exhaust purification catalyst, $NO_x$ contained in exhaust gas and reformed hydrocarbons react whereby a reducing intermediate containing nitrogen and hydrocarbons is produced and wherein the injection period of the hydrocarbons is a period necessary for continued production of the reducing intermediate.

9. An exhaust purification system of an internal combustion engine as claimed in claim 8, wherein the injection period of the hydrocarbons is 0.3 second to 5 seconds.

10. An exhaust purification system of an internal combustion engine as claimed in claim 2 wherein when the amount of hydrocarbons which are fed from the hydrocarbon feed valve and which slip through the exhaust purification catalyst exceeds a predetermined limit value, it is judged that the exhaust purification catalyst has become degraded or there is an abnormality in the amount of injection from the hydrocarbon feed valve.

11. An exhaust purification system of an internal combustion engine as claimed in claim 1, wherein said precious metal catalyst is comprised of platinum Pt and at least one of rhodium Rh and palladium Pd.

12. An exhaust purification system of an internal combustion engine as claimed in claim 1, wherein a basic layer containing an alkali metal, an alkali earth metal, a rare earth, or a metal which can donate electrons to $NO_x$ is formed on the exhaust gas flow surface of the exhaust purification catalyst and wherein a surface of said basic layer forms said basic exhaust gas flow surface part.

* * * * *